United States Patent [19]
Mihara et al.

[11] Patent Number: 5,032,939
[45] Date of Patent: Jul. 16, 1991

[54] TAPE CASSETTE LOADING SYSTEM COMPATIBLE WITH TWO DIFFERENT SIZED CASSETTES

[75] Inventors: Masato Mihara, Hiratsuka; Hiromichi Hirayama, Yokosuka; Mitsuhiko Hara, Kawasaki; Mitsuo Harumatsu, Tokyo, all of Japan

[73] Assignee: Victor Company of Japan, Ltd., Kanagawa, Japan

[21] Appl. No.: 254,455

[22] Filed: Oct. 6, 1988

[30] Foreign Application Priority Data

| Oct. 7, 1987 | [JP] | Japan | 62-253096 |
| Dec. 2, 1987 | [JP] | Japan | 62-305164 |
| Dec. 2, 1987 | [JP] | Japan | 62-305165 |

[51] Int. Cl.$^5$ ............................................. G11B 5/008
[52] U.S. Cl. ........................... 360/94; 360/96.5; 360/95; 360/85
[58] Field of Search ............... 360/91, 92, 94, 96.5, 360/83, 84, 85, 90, 93, 132, 95

[56] References Cited

U.S. PATENT DOCUMENTS

| 3,594,008 | 7/1971 | Takagi et al. | 360/94 |
| 3,740,495 | 6/1973 | Kihara | 360/85 |
| 4,268,877 | 5/1981 | Moris et al. | 360/94 |
| 4,635,148 | 1/1987 | Kusaka | 360/96.5 X |
| 4,664,337 | 5/1987 | Shiratori | 360/94 X |
| 4,794,477 | 12/1988 | Hashiguchi et al. | 360/96.5 |
| 4,799,117 | 1/1989 | Ohyama | 360/96.5 |
| 4,803,575 | 2/1989 | Nishimura et al. | 360/94 |

FOREIGN PATENT DOCUMENTS

| 0133822 | 3/1985 | European Pat. Off. . |
| 0204585 | 12/1986 | European Pat. Off. . |
| 2843336 | 4/1979 | Fed. Rep. of Germany . |
| 2844566 | 4/1979 | Fed. Rep. of Germany . |
| 3327403 | 4/1985 | Fed. Rep. of Germany . |
| 3432831 | 11/1985 | Fed. Rep. of Germany . |
| 3430452 | 3/1986 | Fed. Rep. of Germany . |
| 182658 | 8/1986 | Japan . |
| 182660 | 8/1986 | Japan . |
| 269257 | 11/1986 | Japan . |

*Primary Examiner*—Robert S. Tupper
*Assistant Examiner*—Andrew L. Sniezek
*Attorney, Agent, or Firm*—Michael N. Meller

[57] ABSTRACT

A tape cassette loading system of a magnetic recording and reproducing apparatus comprises a cassette tray adapted for holding a standard size tape cassette and having a depression adapted for holding a compact size tape cassette, a cassette carriage for transporting the cassette tray in a horizontal direction from an unloading position to the inside of the magnetic recording and reproducing apparatus, and an elevating mechanism for moving the cassette tray transported to the inside of the magnetic recording and reproducing apparatus in a downward direction to a loading position where the tape cassette is located ready for loading on a rotary drum assembly of the apparatus. The loading system comprises detecting switches for detecting uncorrect state of the tape cassette on the cassette tray and a controller for inhibiting the continuation of loading procedure when it is detected that the tape cassette is not properly or correctly placed on the cassette tray. The lock of the lid of the tape cassette is released when the tape cassette is lowered to the loading position and the lid is opened by engagement with a lid opening mechanism.

17 Claims, 16 Drawing Sheets

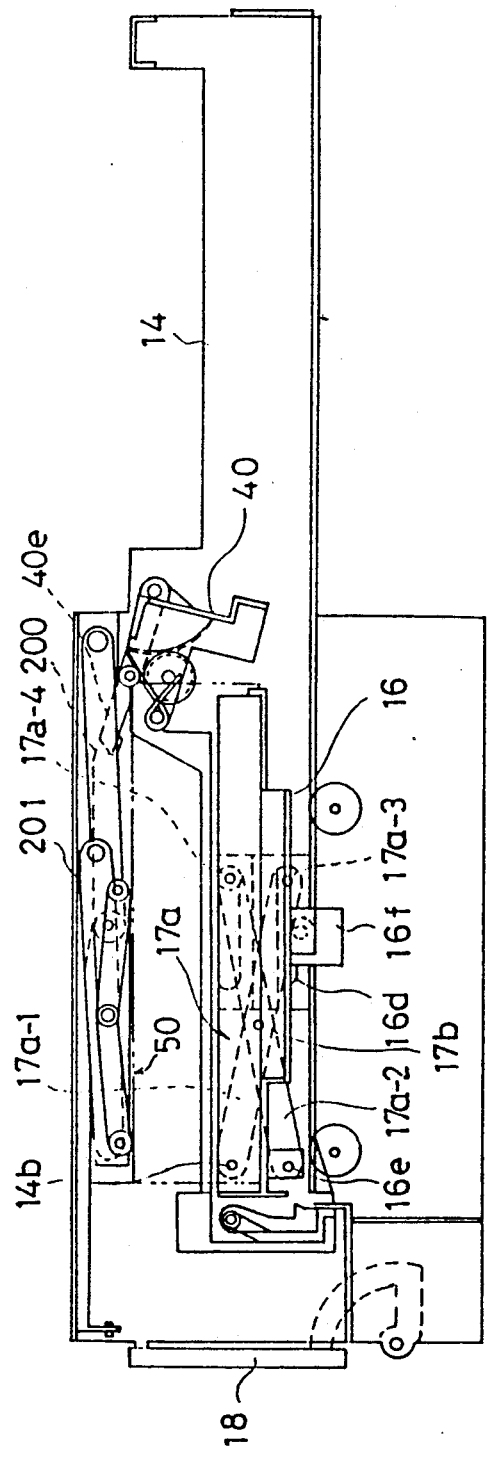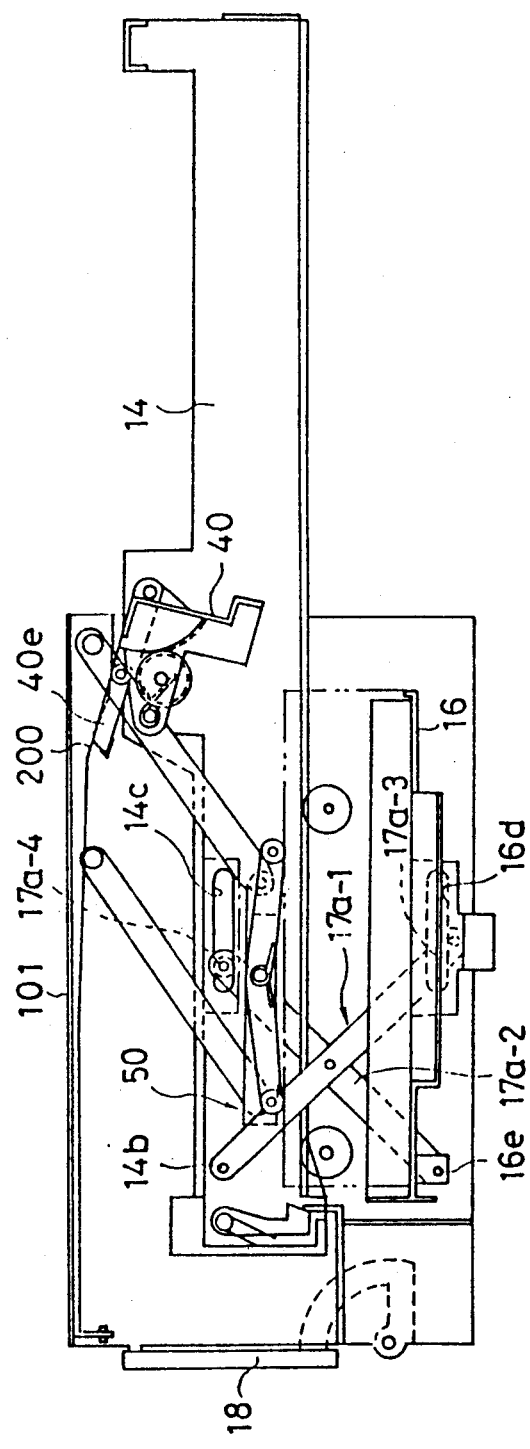
FIG. 10 (A)
FIG. 10 (B)

FIG. 16

|           | SW 60 | SW 61 | SW 73 | SW 74 |
|-----------|-------|-------|-------|-------|
| FIG. 11   | 0     | 0     | 0     | 0     |
| FIG. 12   | 1     | 1     | 0     | 0     |
| FIG. 13A  | 1     | 0     | 0     | 0     |
| FIG. 13B  | 0     | 1     | 0     | 0     |
| FIG. 14   | 0     | 0     | 1     | 1     |
| FIG. 15A  | 0     | 0     | 1     | 0     |
| FIG. 15B  | 0     | 0     | 0     | 1     |

TAPE CASSETTE LOADING SYSTEM COMPATIBLE WITH TWO DIFFERENT SIZED CASSETTES

BACKGROUND OF THE INVENTION

The present invention relates in general to magnetic recording and reproducing apparatus for recording and reproducing an information signal on and from a magnetic tape and in particular to a cassette loading system used in a magnetic recording and reproducing apparatus for loading and unloading a magnetic tape contained in a tape cassette on and from the apparatus.

Current magnetic recording and reproducing apparatus which records and reproduces an information signal on and from a magnetic tape such as a video tape recorder is loaded with magnetic tape in a manner such that the tape is contained in a tape cassette for ease of handling as well as for protection of the magnetic tape. In order to load the magnetic tape contained in the tape cassette into the recording and reproducing system of the video tape recorder which includes a rotary drum on which magnetic heads are carried, a cassette loading system is used for transporting the tape cassette from an eject position to a predetermined loading position defined relative to the position of the rotary drum and for wrapping the tape around the rotary drum in a predetermined manner. The loading system is used also for disengaging the magnetic tape from the rotary drum and for transporting the tape cassette back to the initial eject position for removal of the tape cassette.

There are several types of tape cassettes which are currently sold in the market. One typical example of such a tape cassette is called a "standard size" tape cassette and is used widely in home video tape recorders. The aforementioned standard size tape cassette may have a typical dimension of 188×104×25 mm, for example, and accommodates a half inch wide magnetic tape wound around a supply reel and a take up reel with such an amount that a few hours of recording time is obtained. The specification for the tape cassette as well as for the recording format on the magnetic tape is standardized in relation to the type of video tape recorder so that the magnetic tape cassettes produced by different manufacturers can be used as long as the specification matches the type of video tape recorder.

Recently, a more compact video tape recorder was developed so as to realize a portable video tape recorder combined with a television camera and the like. Such a compact video tape recorder naturally uses a compact size tape cassette having a reduced size so as to decrease the size and weight of the video tape recorder. In order to reduce the size, the compact size tape cassette contains a smaller amount of magnetic tape having a substantially reduced separation between a supply reel and a take up reel. On the other hand, the recording format of the video signal and the audio signal on the tape are identical to the "standard size" tape cassette, so that the compatibility with the home video tape recorder currently in use is maintained.

Conventionally, such a compact size tape cassette is reproduced by the home video tape recorder by using an adapter having a size identical to the size of the standard size tape cassette into which the compact size tape cassette is accommodated, as the size and construction of the tape cassette do not match with the loading system of the video tape recorder designed for the standard size tape cassette. However, the use of such adapter is cumbersome and indeed inconvenient. Thus, there is a demand for a cassette loading system of a video tape recorder which can handle both the standard size tape cassette and compact size tape cassette.

According to the Laid-open Japanese Patent Application 269257/1986, a loading system of a video tape recorder is disclosed in which the size of a holder for holding the tape cassette can be changed responsive to the size of the tape cassette so that the loading system can handle the tape cassettes having different sizes. Further, there is a known loading system in which the compact size tape cassette is loaded into the video tape recorder by guiding the tape cassette along a side wall of a holder. In both of these loading systems, the tape cassette is loaded into the video tape recorder through an aperture at a front panel of the video tape recorder. As the video tape recorder has the rotary drum carrying magnetic heads at a position relatively far from the front panel, the tape cassette is usually inserted with an orientation such that a first side of the tape cassette, along which the magnetic tape is scanned by the magnetic heads, faces the rotary drum at the inside of the video tape recorder while a second side of the cassette opposite to the first side faces the outside of the video tape recorder. This means that one has to insert the compact size tape cassette relatively deeply in the video tape recorder so that the magnetic tape along the first side of the tape cassette reaches a predetermined position close to the rotary drum. However, such an operation is difficult for an ordinary person as one has to push the second side or back of the tape cassette by inserting ones finger deeply into the apparatus through the aperture at the front panel. Thus, such an operation tends to cause improper loading of the tape cassette. Further, such a loading system is complex in structure. Thus, the prior art loading system is unsatisfactory with respect to the handling of the compact size tape cassettes and an improved loading system which eliminates these problems is desired.

On the other hand, the Laid-open Japanese Patent Application 182660/1986 discloses a cassette loading system using a cassette tray on which is placed a tape cassette at the time of loading. As described previously, the tape cassette must be loaded in a proper orientation. In order to prevent erroneous loading, this prior art loading system uses projections at predetermined positions on the cassette tray which abuts with a bottom of the tape cassette when the tape cassette is loaded in an improper state. In this state, the tape cassette is held in a slightly lifted state in the loading system so that the user can inspect visually the improper loading of the tape cassette. When the tape cassette is loaded properly, on the other hand, the projection engages with a depression formed at the bottom of the tape cassette and the tape cassette is held properly in the loading system.

However, such a loading system relies upon judgement for the loading state of the tape cassette by the user who inspects the loading state only visually. Thus, there is a substantial risk that the user starts operation of the video tape recorder which is not properly loaded with the tape cassette without noticing the improper loading state of the cassette. Once the video tape recorder is started in such a state, the loading system starts to transport the tape cassette even if it is not loaded properly, and the tape cassette can be damaged seriously.

Accordingly, there is a need for a loading system of a magnetic recording and reproducing apparatus in which improper loading of the tape cassette on the loading system is detected and the loading operation of the improperly loaded cassette which may cause damage to the cassette as well as to the loading system is positively prevented.

Tape cassette according to the standardized specification generally has a front lid along the first side of the cassette such that the lid is opened to allow the magnetic tape to be drawn out at the time of recording and reproducing but is closed for protection of the magnetic tape when the cassette is not used. The front lid is locked when the lid is in the closed state by a locking member. In order to unlock the front lid, the loading system of the video tape recorder has an operating member which urges the locking member such that the lock of the lid is released when the tape cassette is properly loaded. This operating member of the loading system continuously urges the locking member as long as the tape cassette is loaded in the video tape recorder. When the tape cassette is to be removed from the video tape recorder, the urging force exerted on the locking member by the operating member is removed and the locking member is returned to an unurged state when the lid is closed. Thus, the lid is locked again in the closed state.

The return of the locking member to the unurged state is made possible by the resiliency of the locking member. In the standard size tape cassette, this resiliency of the locking member is obtained by a coil spring and the like. In the case of the compact size tape cassette, on the other hand, this resiliency of the locking member is obtained by providing resiliency to the locking member itself. For this purpose, the locking member of the compact tape cassette is made of a thin plastic material.

In such a compact size tape cassette, there is a problem that the locking member tends to become permanently deformed when the tape cassette is kept in the loaded state in the video tape recorder for a prolonged time period. Such a permanent deformation is caused as a result of the continuous action of the operating member applied to the locking member for a prolonged time period. Once the permanent deformation appears, the locking member cannot hold the front lid properly and dust and other exotic materials easily enter the tape cassette and the magnetic tape in the cassette is damaged. Thus, an improved mechanism for manipulating the locking member of the front lid of the tape cassette is needed.

SUMMARY OF THE INVENTION

Accordingly it is a general object of the present invention to provide a novel and useful cassette loading system of a magnetic recording/reproducing apparatus wherein the aforementioned problems are eliminated.

Another and more specific object of the present invention is to provide a cassette loading system of a magnetic recording and reproducing apparatus for loading a tape cassette containing a magnetic tape such that the magnetic tape is located at a predetermined position ready for wrapping around a rotary drum of the recording/reproducing apparatus wherein the loading of both a standard size tape cassette and a compact size tape cassette having a size smaller than the standard size tape cassette can be made easily and reliably.

Another object of the present invention is to provide a cassette loading system of a magnetic information signal recording/reproducing apparatus for loading a tape cassette containing a magnetic tape in which a loading of tape cassette in an erroneous or improper state is positively prevented by detecting the state of the tape cassette in the loading system and disabling the loading procedure when such an erroneous state of the tape cassette is detected in the loading system.

Another object of the present invention is to provide a cassette loading system of a magnetic recording and reproducing apparatus for loading a tape cassette containing a magnetic tape such that the magnetic tape is located at a predetermined loading position ready for loading on a rotary drum which forms a part of the recording/reproducing system of the apparatus in which a cassette tray which is movable in a horizontal direction between a first state in which the cassette tray is fully pulled out from the recording/reproducing apparatus and a second state in which the cassette tray is fully pushed in to the recording/reproducing apparatus is used for holding a standard size tape cassette having a standard size. The cassette tray is further movable vertically between said second state and a third state in which the magnetic tape is located at said predetermined loading position. The cassette tray is further provided with a depression adapted to hold a compact size tape cassette having a size which is substantially smaller than the size of the standard size tape cassette. In the second state, the magnetic tape in the tape cassette is located at said predetermined loading position ready for loading on the rotary drum of the recording and reproducing apparatus. According to the present invention, the cassette tray does not use any moving parts, and the construction of the loading system can be simplified. Further, the operation to be made by the user at the time of loading of the standard size tape cassette is simple as the only operation the user has to perform is to place the tape cassette on the cassette tray and start the operation of the loading system. Further, when loading the compact size tape cassette, the cassette is simply placed on the depression formed on the carriage. Therefore, the loading operation performed by the user is extremely simplified even if the cassette to be loaded is the compact size tape cassette. The size and shape of the depression are adapted to the size and shape of the compact size tape cassette so that the compact size tape cassette is held in the depression without ambiguity in the orientation of placement or excessive play. In a preferred embodiment of the present invention, the depression is marked with a color different from the color of the other part of the cassette tray so that the user can easily visually recognize the depression on which the compact size tape cassette is to be placed.

Another object of the present invention is to provide a cassette loading system of a magnetic recording and reproducing apparatus for loading a tape cassette containing a magnetic tape comprising a cassette carriage which forms a part of the recording and reproducing apparatus and is movable in a horizontal direction relative to the recording and reproducing apparatus, a cassette tray carried by the cassette carriage in a movable manner in the horizontal direction together with the cassette carriage and further in a vertical direction separately from the cassette carriage and adapted to accept and hold the tape cassette placed thereon, a cassette carriage transport mechanism for transporting the cassette carriage horizontally between a first position in which the cassette tray carried by the cassette carriage is located substantially outside the recording and reproducing apparatus for placing or removal of the tape cassette and a second position in which the tape cassette placed on the cassette tray is located inside the recording and reproducing apparatus, and a cassette tray elevator mechanism for vertically transporting the cassette tray between the second position and a third tape loading position at which the magnetic tape in the tape cassette assumes a position ready for loading on a rotary drum which forms a part of a recording/reproducing system of the magnetic recording and reproducing apparatus, wherein a projection is provided in the cassette tray for preventing an incorrect placement of the tape cassette on the cassette tray when the tape cassette is placed on the cassette tray improperly or in a wrong direction by abutting with a bottom of the tape cassette, at least a pair of cassette detecting switches are provided on the cassette tray on the surface of the cassette tray such that the detecting switches are closed simultaneously only when the tape cassette is placed on the cassette tray in a proper state, and the cassette carriage transport mechanism and the cassette tray elevator mechanism are driven by a control circuit means only when all of the detecting switches are closed by the proper placement of the tape cassette on the cassette tray. According to the present invention, the operation of the loading system with respect to improper placement of the tape cassette on the cassette tray is positively prevented and the damage to the tape cassette as well as to the loading system is prevented. Further, the arrangement of the cassette detection switches combined with said projection is reliable for detection of the improper state of the tape cassette on the cassette tray.

Another object of the present invention is to provide a cassette loading system of a magnetic recording and reproducing apparatus adapted for loading a tape cassette having a front lid which protects a magnetic tape contained in the tape cassette such that the lid is locked at a closed state by a locking mechanism on the tape cassette when the tape cassette is in an unloaded state and is opened when the tape cassette is loaded in the magnetic information signal recording/reproducing apparatus, wherein the lock of the lid is released by the loading system exerting a force on the locking mechanism of the tape cassette immediately before opening of the lid, while the force exerted on the locking mechanism by the loading system for releasing the lock is removed after the lid is opened and the tape cassette is securely loaded in the magnetic information recording/reproducing apparatus. According to the present invention, the permanent deformation of the locking mechanism due to a continuous exertion of the force by the loading system is avoided.

Another object of the present invention is to provide a cassette loading system of a magnetic recording and reproducing apparatus for loading a magnetic tape contained in a standard tape cassette having a standard size and a compact tape cassette having a size smaller than the size of the standard tape cassette respectively having lids for protection of the magnetic tape, wherein the loading system comprises first and second mechanisms respectively adapted to open the lids of the standard size and compact size tape cassettes such that the position of the second mechanism for opening the lid of the compact size tape cassette is movable responsive to the invasion of the standard size tape cassette As the compact size tape cassette has a smaller size as compared to the standard size tape cassette, the mechanism for opening the lid of the compact size tape cassette inevitably occupies a location which interferes with a path of the tape cassette along which the standard size tape cassette is transported. According to the present invention, the standard size tape cassette and the compact size tape cassette are loaded on the magnetic recording and reproducing apparatus without problem due to the displacement of the obstructing second mechanism from the path of the tape cassette when the standard size tape cassette is loaded.

Another object of the present invention is to provide a cassette loading system of a magnetic recording and reproducing apparatus for loading a magnetic tape contained in a tape cassette such that the tape cassette to be loaded is placed on a cassette tray carried by a cassette carriage in a movable manner in the horizontal direction between a first position substantially outside the recording and reproducing apparatus and a second position inside the recording and reproducing apparatus responsive to the driving of the cassette carriage, said cassette tray being further movable vertically between said second position and a predetermined loading position, wherein the cassette tray is maintained horizontally when it is moved between the second position and the predetermined loading position by means of a deformable link mechanism having one end connected to the cassette carriage and the other end connected to the cassette tray. According to the present invention, a bulky cam mechanism such as is used in the prior art loading system disclosed in Laid-open Japanese Patent Application No. 182658/1986 for elevating the cassette tray is eliminated and the stroke of elevation of the cassette tray can be chosen freely irrespective of the thickness of the cassette carriage. Thus, the cassette carriage can be made thin and the loading system of the present invention can be designed to have a small thickness.

Another object of the present invention is to provide a cassette loading system of a magnetic recording and reproducing apparatus for loading a magnetic tape contained in a tape cassette by placing the tape cassette on a cassette tray in a movable manner in a horizontal direction between a first position substantially outside the recording and reproducing apparatus and a second position inside the recording and reproducing apparatus, said cassette tray being further movable in a vertical direction between said second position and a predetermined loaded position, wherein said cassette tray comprises a first part for supporting the tape cassette and a second part comprised of a bottom plate and a vertical end plate formed integral with and continuous to said bottom plate so as to cover an end of the tape cassette extending beyond the first part. When the cassette tray is located at said first position, the second part is held at a first position in which the bottom plate and the vertical end plate contact the end portion of the tape cassette on the cassette tray and the end of the tape cassette extending beyond the first part of the cassette tray is covered by the bottom plate and the vertical end plate. On the other hand, when the tape cassette is moved from said first position to the second position, the second part of the cassette tray is rotated to a second position in which the bottom plate and the vertical end plate are rotated and moved away from the end position of the tape cassette According to the present invention, the tape cassette is securely held by the cassette tray comprising said first and second parts when the cassette tray is in the first position outside of the recording/reproducing apparatus. Further, the movement of the second part of the cassette tray to the second state exposes the end portion of the tape cassette where the lid is provided As a result, the lid is opened by the loading system when the cassette tray is moved to the predetermined loading position from said second position and the loading of the magnetic tape on a rotary drum of the magnetic recording/reproducing apparatus becomes possible. Further, this second part prevents the penetration of dust and other exotic materials into the recording/reproducing apparatus when the cassette tray is located outside the apparatus. Furthermore, as a result of use of the movable second part which closes a rear portion of the cassette tray when the cassette tray is drawn outside of the apparatus, the risk that the user is injured by inserting his or her finger into the apparatus through the aperture at the rear portion of the cassette tray in order to remove the exotic materials which have accidentally fallen into the apparatus is substantially eliminated.

Still other objects and further features of the present invention will be apparent from the following detailed description when read in conjunction with the attached drawings.

DESCRIPTION OF THE DRAWINGS

FIGS. 8-10 are side views respectively showing construction and operation of a cassette carriage moving mechanism for moving the tape cassette on the cassette tray in a horizontal direction and a cassette tray elevating mechanism for moving the cassette tray in a vertical direction;

FIG. 16 is a diagram showing a state of a detection signal indicating the state of the tape cassette on the cassette tray of FIG. 1;

DETAILED DESCRIPTION

First, tape cassettes to be used in the cassette loading system of the present invention will be described with reference to FIG. 1 and FIGS. 2(A)-(D).

Figure 1:
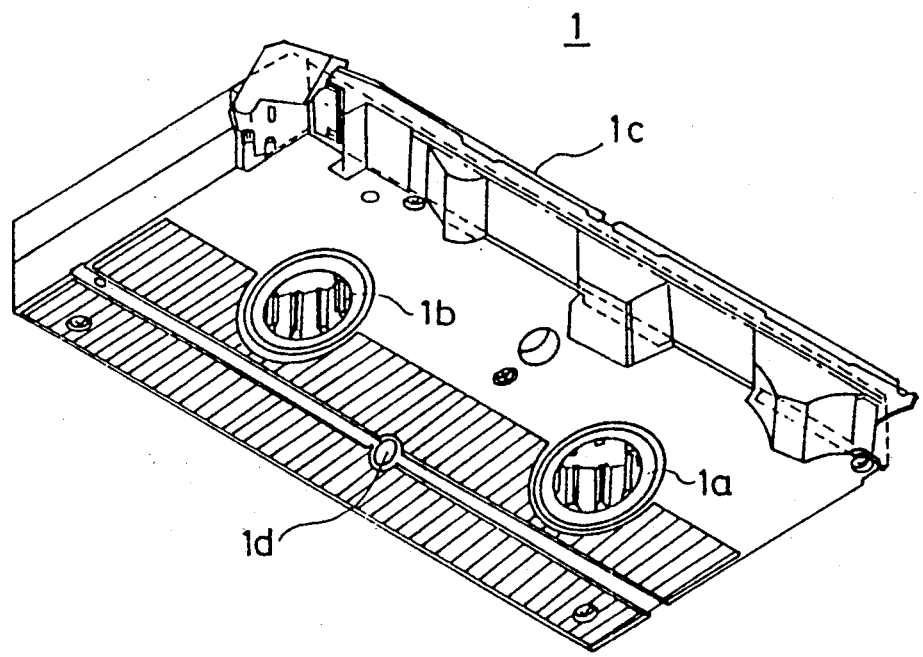
FIG. 1 is a perspective view showing a standard size tape cassette used in the cassette loading system of the present invention.

FIG. 1 shows a standard size tape cassette 1 commonly used in a home video tape recorder. Such a tape cassette may have a typical size of 188 mm × 10 mm × 25 mm, for example and has a lid 1c for protecting a magnetic tape contained in the tape cassette. The magnetic tape typically has a width of half an inch and is wound on a supply reel 1a in the tape cassette 1. The magnetic tape is supplied from the supply reel 1a and passes along a front side of the tape cassette as shown in FIG. 1 by a broken line. When the tape cassette is outside of the video tape recorder, the lid 1c is closed and the magnetic tape is protected against penetration of dust and the like. The magnetic tape is then wound on a take up reel 1b as usual.

Figure 2:
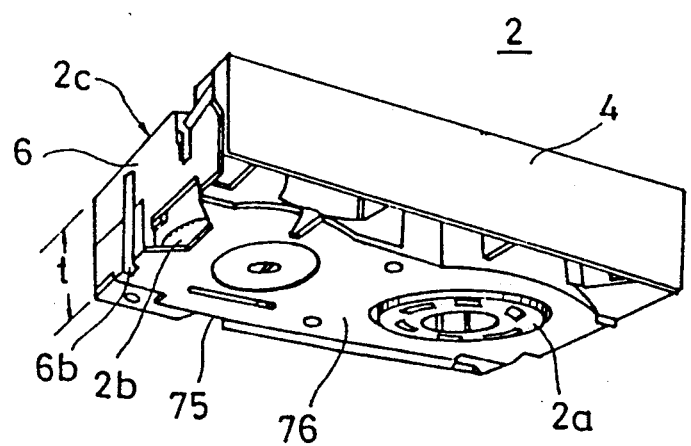
FIGS. 2(A)-2(D) are a perspective view, two side views corresponding to two different states and another perspective view seen from a low position respectively showing a compact size tape cassette used in the cassette loading system of the present invention.
Figure 2:
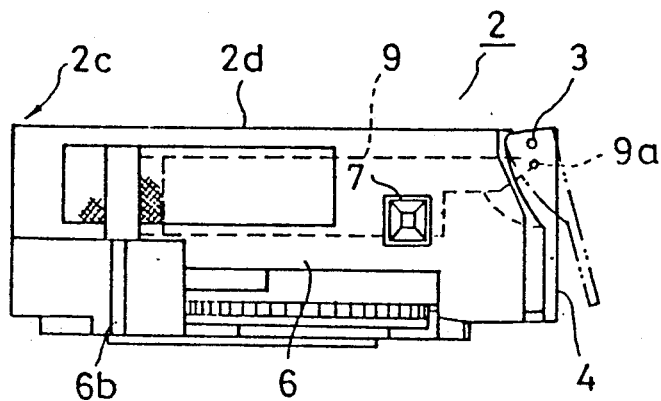
Figure 2:
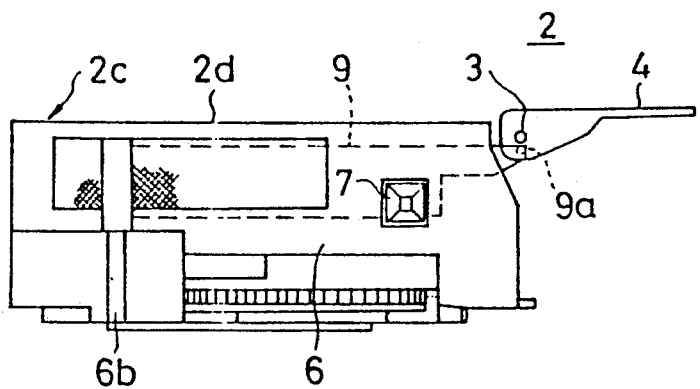
Figure 2:
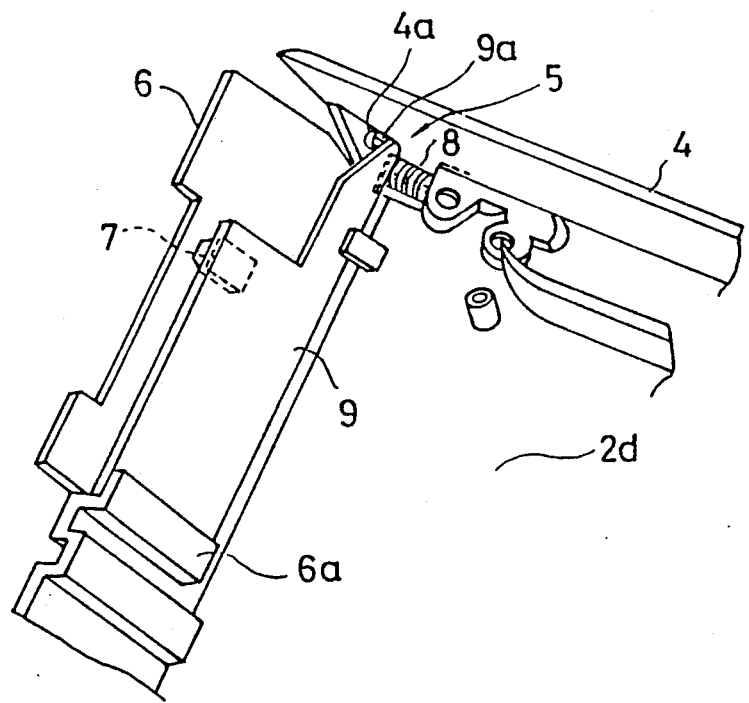

FIG. 2(A) shows a compact size tape cassette 2 which is typically used in a portable video tape recorder such as the video tape recorder combined with a camera. The tape cassette 2 typically has a size of 92 mm × 59 mm × 22 mm and is bound by a front lid 4, a side walls 6, bottom wall 76 and a top wall 2d (not shown in FIG. 2(A)). The tape cassette further comprises a supply reel 2a for supplying the magnetic tape and a take up reel 2b which takes up the supplied magnetic tape. In FIG. 2(A), the height of the compact size tape cassette is represented by t. When the tape cassette 2 is not in use, the magnetic tape is held along a front side of the tape cassette 2 (not shown) similarly to the case of the standard size tape cassette and the magnetic tape along the front side is protected by the lid 4. The lid 4 is opened only when the tape cassette is loaded on the video tape recorder. Otherwise, the lid is closed for protection of the magnetic tape. Although the format of the signals recorded on the magnetic tape is the same in both the standard size tape cassette and the compact size tape cassette, the design of the standard size tape cassette and the compact size tape cassette is substantially different. For example, the separation between the supply reel and the take up reel is different, the position and shape of the cutout formed at the front side of the tape cassette for allowing entrance of a loading mechanism for drawing out the magnetic tape from the tape cassette at the time of loading of the magnetic tape around a rotary drum of the video tape recorder are different in the standard size tape cassette and in the compact size tape cassette, and the mechanism for driving the take up reel is different. In the case of the standard size tape cassette, the take up reel 1b is driven by a rotary shaft inserted into the take up reel 1b. On the other hand, the take up reel 2b is driven by engaging a rotary drive shaft with a flange which forms a part of the take up reel 2b and having teeth around its periphery.

FIGS. 2(B)-(D) show the details of the compact size tape cassette shown in FIG. 2(A). Referring to FIG. 2(B), the tape cassette 2 comprises a cassette housing 2c which has the front lid 4, the side walls 6 at both sides of the housing 2c and a top plate 2d. In the drawing, only one of the side walls 6 is illustrated. The lid 4 has a pin 3 which engages a corresponding opening at a front end of the side wall 6 and is hinged on the front end of the side wall 6 in a rotatable manner between a first state in which the lid 4 is closed and a second state in which the lid is opened. On an inner surface of this side wall 6, a holding member 6a for holding a resilient plate 9 is formed and the resilient plate 9 is fixed on the inner surface of the side wall 6 such that an end of the plate 9 remote from the portion held in the member 6a is movable in a lateral direction. Further, the plate 9 carries a generally square projection 7 which projects from an outer surface of the side wall 6 by penetrating through an opening (not shown) formed in the side wall 6. This projection 7 works as a press button member for releasing a locking mechanism 5 of the lid 4 as will be described. At a tip end of the plate 9 located at a side far from the member 6a, a projection 9a which engages with a corresponding depression formed on the lid 4 is formed so that the rotation or swinging motion of the lid 4 is prevented as long as the projection 9a engages with the depression 4a. The lid 4 is urged to the closed state by a spring 8 which is provided at a front side of the top wall 2d. Responsive to the pressing of the projection 7, the resilient plate 9 is displaced and the projection 9a at the end of the plate 9 is disengaged from the depression 4a formed in the lid 4. In this state, the lid 4 can rotate around the pin 3 against the force of the spring 8 and the lock of the lid 4 is released. Thus, the depression 4a in the lid 4 and the projection 9a of the plate 9 forms the locking mechanism 5 which locks the lid 4 releasably when the lid 4 is in the closed state.

Figure 3:
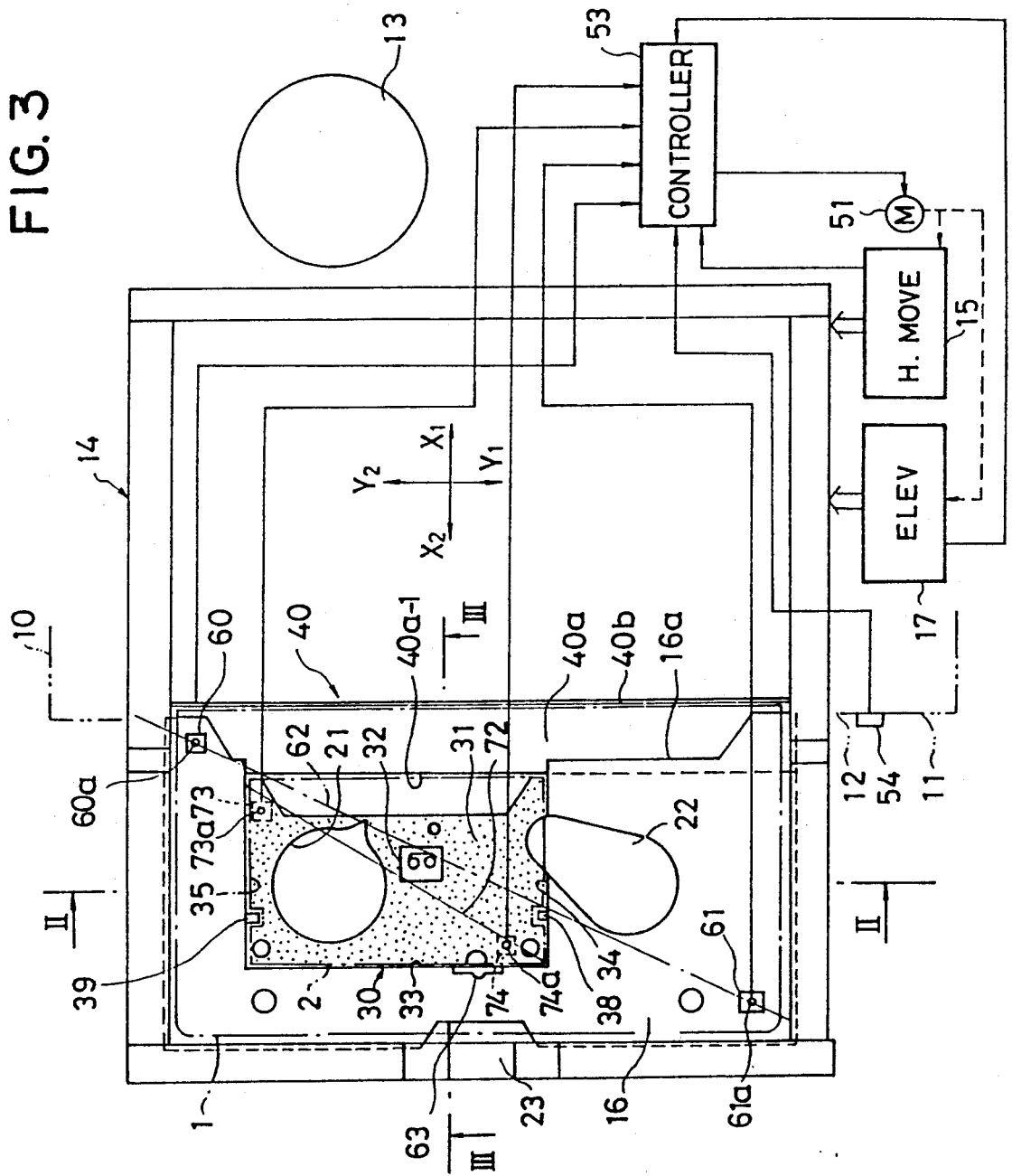
FIG. 3 is a plan view showing an embodiment of the cassette loading system according to the present invention together with a control circuit for detection of improper placement of the tape cassette on the loading system and for prevention of the operation of the loading system under such improper placement.
Figure 4:
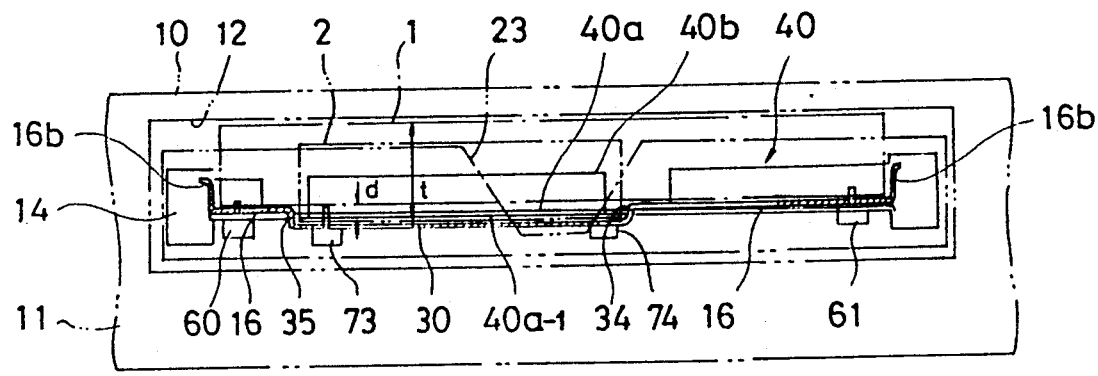
FIG. 4 is a front view showing the loading system of FIG. 3 together with sensors used in the loading system.
Figure 5:
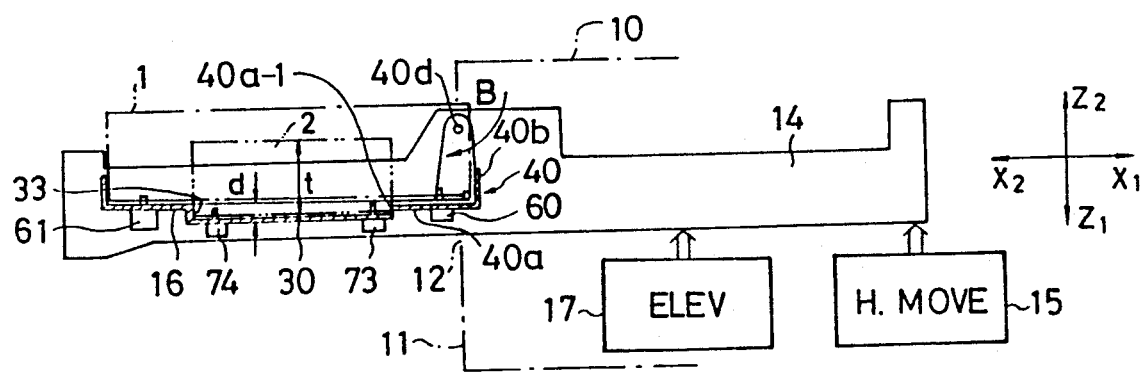
FIG. 5 is a side view showing the cassette loading system of FIG. 3 in a first state in which a tape cassette is placed on a cassette tray in a first state corresponding to a state where the cassette tray is fully pulled out from a magnetic recording and reproducing apparatus together with the sensors used in the loading system.

FIGS. 3-5 show an embodiment of the cassette loading system of the present invention. Referring to the drawing, the cassette loading system comprises a cassette carriage 14 made of a generally rectangular frame and is connected to a video tape recorder body 10 in a movable manner in a horizontal direction as shown by arrows $X_1$ and $X_2$. The video tape recorder has a front panel 11 formed with a front aperture 12 and a guide drum 13 which supports a rotary drum (not shown) on which a plurality of magnetic heads are carried. The guide drum 13 is located on an inside of the video tape recorder body 10 at a position relatively far from the front panel 11. The cassette carriage 14 is moved by a cassette carriage moving mechanism 15 comprising a driving motor 51 and a cooperating gear system cooperating with the motor 51.

In order to accept and hold the standard size tape cassette 1, a cassette tray 16 is used. The cassette tray 16 is a generally rectangular tray or plate defined by a side wall 16b (FIG. 4) extending around the tray 16 except for a cutout 16a formed at a rear end of the cassette tray 16. The cutout 16a is made so as to allow insertion of the tape loading mechanism (not shown) of the video tape recorder. The cutout 16a is closed by a separate tray portion 40 as will be described later. The cassette tray 16 and the separate tray portion 40 are adapted to support the standard tape cassette placed on the tray 16 without substantial play. In other words, the cassette tray 16 and the tray portion 40 are adapted to match the shape of the standard size tape cassette. In order to prevent erroneous placement of the cassette 1, a projection 63 which engages a corresponding depression 1d (FIG. 1) at the bottom of the cassette 1 is formed on the cassette tray 16. When the tape cassette 1 is placed in a wrong direction or in any improper state, the projection 63 abuts to the bottom of the tape cassette 1 and the user can notice the improper state of the tape cassette visually. In FIG. 3, the standard size tape cassette 1 is illustrated by a one dotted chain line.

The cassette tray 16 is moved vertically by a cassette tray elevating mechanism 17 comprising the motor 51, a gear system (not shown) connected to the motor 51, and an arm system (not shown) connected to the gear system. The mechanism 17 moves the cassette tray 16 vertically independent of the cassette carriage 14 as shown by arrows $Z_1$ and $Z_2$ in FIG. 5.

A similar cassette loading system comprising a cassette tray for holding a tape cassette, a cassette carriage for moving the cassette tray horizontally, and an elevating mechanism for moving the cassette tray vertically is also disclosed in the aforementioned Laid-open Japanese Patent Application 182658/1986.

In such a cassette loading system the loading of the standard tape cassette on the video tape recorder is achieved as follows:

1) Firstly, the cassette carriage 14 is fully retracted into the video tape recorder body 10 and the front aperture 11 is closed by a lid 18.

2) Responsive to the manipulation of a start switch 54 at the front panel 12 by the user, the motor 51 is started in a first direction and the cassette carriage moving mechanism 15 for moving the cassette carriage 14 is driven such that the cassette carriage 14 is moved in the direction as indicated by the arrow $X_2$ and reaches a position indicated in FIG. 5. In this state, the cassette carriage 14 is fully pulled out from the video tape recorder body 10.

3) Next, the standard size tape cassette 1 is placed on the cassette tray 16 from an upward direction as indicated by the one dotted line in FIG. 5.

4) Further, the start switch 54 is manipulated again. Responsive to the manipulation of the switch 54, the motor 51 is started in a second direction opposite to the first direction and the mechanism 15 is driven in an opposite direction. As a result, the cassette carriage 14 is moved to a position illustrated in FIG. 6 in the direction shown by the arrow $X_1$. The cassette tray 16 moves together with the cassette carriage 14 and the tape cassette 1 placed on the cassette tray 16 is brought into the video tape recorder body 10. In this state, the cassette tray 16 is released from the cassette carriage 14.

15) Next, the motor 51 is driven in the second direction and the cassette tray elevating mechanism 17 is actuated. As a result, the cassette tray 16 moves in the downward direction indicated by the arrow $Z_1$ to a position illustrated in FIG. 7 independent of the cassette carriage 14.

Figure 7:
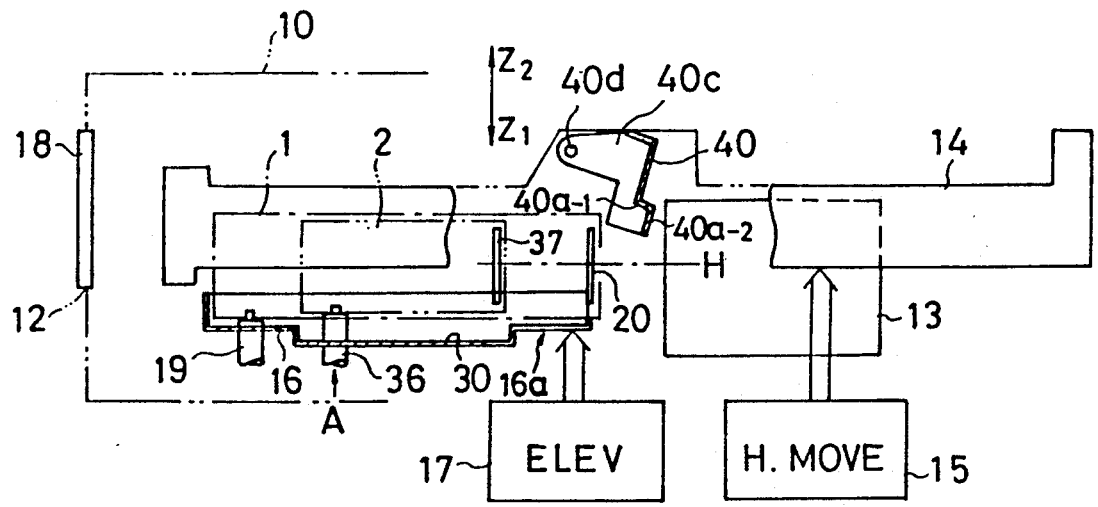
FIG. 7 is a side view of the cassette loading system of FIG. 3 in a third state in which the cassette tray carrying the tape cassette is in a third state corresponding to a predetermined loading position of the magnetic tape contained in the tape cassette.

6) Together with the movement of the cassette tray 16 in the downward direction, the tape cassette 1 goes down as illustrated in FIG. 7 and reaches a loading position. In this state, the supply reel 1a and the take up reel 1b of the tape cassette 1 engage respective driving shafts (not shown). At the same time, the tape cassette 1 is supported by a positioning pin 19 which adjusts the height of the tape cassette 1 in this loading position by abutting the bottom of the tape cassette 1. Thus, the tape cassette is held such that a magnetic tape 20 contained in the tape cassette 1 assumes a position in which the center of the magnetic tape 20 is located at a predetermined height H. In this state, the magnetic tape is loaded on the guide drum 13 by a well known tape loading mechanism and the recording and reproducing on and from the magnetic tape 20 is achieved. It should be noted that the driving shafts for driving the supply reel 1a and the take up reel 1b are inserted into the tape cassette 1 through a pair of openings 21 and 22 in FIG. 3.

7) When ejecting the tape cassette 1 which is loaded in the video tape in the state in FIG. 7, the switch 54 at the front panel of the video tape recorder is manipulated. Responsive thereto, the cassette carriage moving mechanism 15 and the cassette tray elevating mechanism 17 are driven in an opposite direction and the cassette tray is returned to the state shown in FIG. 5. In this state, the tape cassette 1 can be easily removed from the cassette tray 16 by placing a finger of the user at a cutout 23 formed in a front portion of the wall 16b of the cassette tray 16.

Next, an essential part of the first embodiment of the present invention will be described.

Referring to FIG. 3 again, the cassette tray 16 comprises a depression 30 having a size and shape corresponding to those of the compact size tape cassette 2 such that the tape cassette 2 is held in the depression 30 securely without substantial play. The depression 30 has a depth d measured from the surface of the cassette tray 16 which is chosen equal to about 1/5 of the height t of the compact size tape cassette 2. The compact size tape cassette 2 is designed such that the cassette is loaded in a manner that the supply reel 2a of the tape cassette 2 coincides with the position of the supply reel 1a of the standard size tape cassette 1. Thus, the depression 30 is formed on the cassette tray in such a position that the supply reel 2a of the compact size tape cassette 2 placed on the depression 30 coincides with the position of the supply reel 1a of the standard size tape cassette 1 placed on the cassette tray 16.

The depression 30 on the cassette tray may have a color different from the color of the rest of the cassette tray 16 so that the user can easily recognize the depression 30 on which the tape cassette 2 should be placed. Further, a marking 32 indicating the orientation of the tape cassette to be placed may be printed on the depression 30.

When the compact size tape cassette 2 is to be placed on the depression 30 of the cassette tray 16, the cassette carriage 14 is fully pulled out from the video tape recorder body 10 and the tape cassette 2 is placed on the depression 30 from the upward direction similarly to the case of placement of the tape cassette 1 on the cassette tray 16. The tape cassette 2 properly placed on the depression 30 is illustrated in FIGS. 3 and 5 by a two dotted line. As the depression 30 is clearly distinguished from the other portions of the cassette tray 16 by the color, the risk of erroneous placement of the tape cassette 2 on the depression 30 is minimized. In the state that the tape cassette 2 is properly placed in the depression 30, about one fifth of the height of the tape cassette 2 is located below the level of the surface of the cassette tray 16 while the other four fifths of the tape cassette 2 projects upwards from the cassette tray 16. Thus, the tape cassette 2 is restricted in the movement in the $X_2$, $Y_1$ and $Y_2$ directions by peripheral walls 33, 34 and 35 defined around the depression 30. The tape cassette 2 is further restricted in the movement in the $X_1$ direction by the aforementioned separated tray portion 40. The detailed description of the separated tray portion 40 will be given later.

Figure 6:
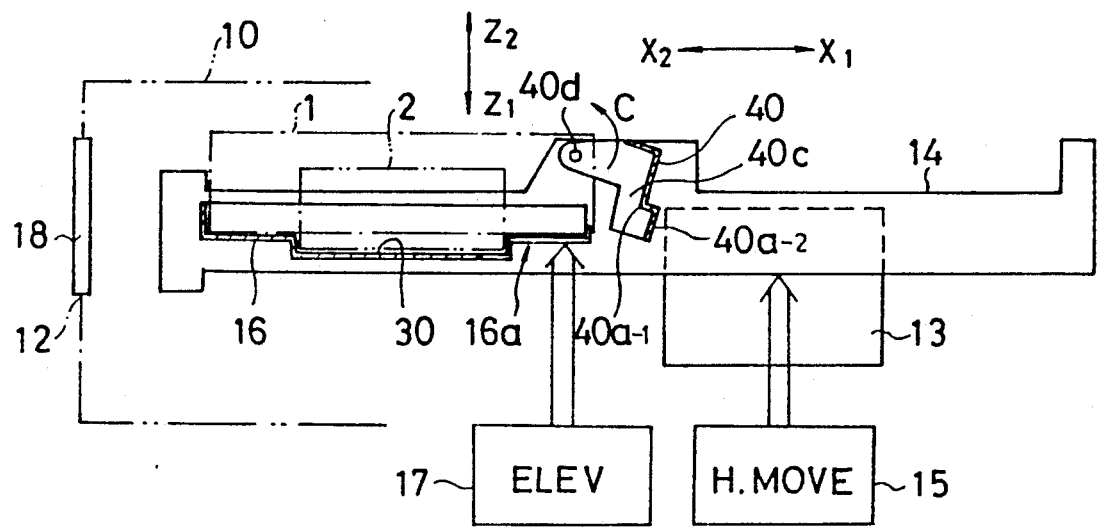
FIG. 6 is a side view of the loading system of FIG. 3 in a second state in which the cassette tray carrying the tape cassette is in a second state corresponding to a state where the cassette tray is fully pushed into the recording and reproducing apparatus.

The moving mechanism 15 and the elevating mechanism 17 work exactly the same as in the case when the standard size tape cassette 1 is loaded. Thus, the compact tape cassette 2 is moved in the $X_1$ direction together with the cassette tray 16 and brought into a position located at the inside of the video tape recorder body 10 as illustrated in FIG. 6. From this position, the tape cassette 2 is lowered together with the cassette tray 16 in the $Z_1$ direction and reaches the loaded position shown in FIG. 5. Further, a positioning pin 36 is moved upwards to a predetermined height before starting the descent of the cassette tray 16 as shown in FIG. 7. At the same time, a driving gear which meshes with the tooth at the periphery of the flange of the take up reel 2b for driving the take up reel 2b is raised to a predetermined height so that the gear correctly meshes with the teeth of the take up reel 2b.

As illustrated in FIG. 7, the compact size tape cassette 2 assumes the position indicated by the two dotted line in which the supply reel 2a engages the drive shaft (not shown) and the teeth of the take up reel 2b mesh with the driving gear (not shown). Further, the bottom of the tape cassette 2 is held by the positioning pin 36 and a magnetic tape 37 contained in the tape cassette 2 assumes a height suitable for loading on the drum 13. In this state, the center of the magnetic tape 37 assumes the height H similarly to the case of the standard size tape cassette 1. Thereafter, the known tape loading mechanism is activated and the magnetic tape 37 is wrapped around the drum 13 which supports the rotary drum (not shown). Thus, the magnetic tape 37 is scanned by a plurality of magnetic heads carried by the rotary drum and the recording and reproduction of the information signal is made.

On both sides of the depression 30, projections 38 and 39 are provided for preventing erroneous placement of the tape cassette 2 as illustrated in FIG. 3. The projections 38 and 39 project toward the inside of the depression 30 from the right and left side walls 6 of the tape cassette 2. In a proper or normal placement of the tape cassette 2, the tape cassette 2 is placed such that a pair of grooves 6b (FIG. 2(A)) accept the projections 38 and 39. When the tape cassette 2 is placed in an opposite direction such that the front side of the tape cassette 2 faces the the direction away from the video tape recorder 10, on the other hand, the tape cassette 2 cannot be accommodated in the depression 30 due to the abutting of the side walls 6 with the projections 38 and 39. Thus, the user can easily notice the improper placement of the tape cassette 2 and the erroneous loading of the tape cassette on the video tape recorder is prevented.

Responsive to the eject operation of the switch 54, the compact size tape cassette 2 is transported to the position at the outside of the video tape recorder body 10 as shown in FIG. 5 together with the cassette tray 16 on which the tape cassette 2 is placed.

As most of the tape cassette 2 is above the level of the surface of the cassette tray 16, the user can easily remove the tape cassette 2 from the depression 30 by holding the tape cassette by a thumb and a forefinger.

Next, the separated tray portion 40 will be described. The separated tray portion 40 is an elongated plate having a generally L-shaped cross section and comprises an elongated bottom portion 40a and an elongated end portion 40b continuing to the elongated bottom portion 40a. Both of the portions are elongated in a lateral direction perpendicular to the movement of the tape cassette 1 and in the horizontal and vertical directions. At a front end $40_{a-1}$ of the bottom portion 40a, another L-shaped portion $40_{a-2}$ is provided such that an edge of the portion $40_{a-2}$ engages with a rear end of the cassette tray 16 when the separate tray portion 40 is in the first state shown in FIG. 5. Further, both of the ends of the portion 40 are formed by a pair of flanges 40c as illustrated in FIGS. 5-7. The separated tray portion 40 is located at the rear end of the cassette tray 16 and is hinged to the cassette carriage 14 rotatably around a pin 40d formed on the side flange 40c as can be seen particularly clearly in FIGS. 5-7. In FIGS. 3-5, the separated tray portion 40 is rotated in the direction as indicated by an arrow B in FIG. 5, and the bottom portion 40a of the separate tray portion 40 including the L-shaped portion $40_{a-2}$ contacts the rear end of the cassette tray 40. Thus, the cutout 16a at the rear end of the cassette tray 40 is closed by the bottom portion 40a of the separate tray portion 40. In this state, the end portion 40b connects with the side wall 16b of the cassette tray 16. Thus, the lateral movement of the standard size tape cassette 1 in the direction $X_1$ relative to the cassette tray 16 is restricted by the end portion 40b.

In the state shown in FIG. 5, the front end of the bottom portion $40_{a-1}$ also defines a rear end of the depression 30. The edge $40_{a-1}$ is located at a level higher than the level of the bottom 31 of the depression 30 and the tape cassette 2 is also restricted in movement in the $X_1$ direction in the depression 30.

Thus, the separated tray portion 40 closes the cutout 16a when the cassette tray 16 is pulled out from the video tape recorder and prevents the penetration of dust and the like into the body 10 of the video tape recorder.

When the cassette tray 16 is retracted into the body 10 of the video tape recorder, the separated tray portion 40 is rotated in a direction indicated by an arrow C and the cutout 16a is exposed so that the insertion of tape loading mechanism is allowed. The mechanism for rotating the separated tray portion 40 will be described with reference to FIGS. 10(A) and (B) later. As aforementioned, the depression 30 may have a color different from the color of the rest of the cassette tray 16.

Next, the cassette carriage moving mechanism 15 and the cassette tray elevating mechanism 17 in FIG. 3 will be described with reference to FIGS. 8, 9(A), 9(B), 10(A) and 10(B). In the drawings, those portions constructed identically to those corresponding portions in the previous drawings are given identical reference numerals and the description thereof will be omitted.

Figure 8:
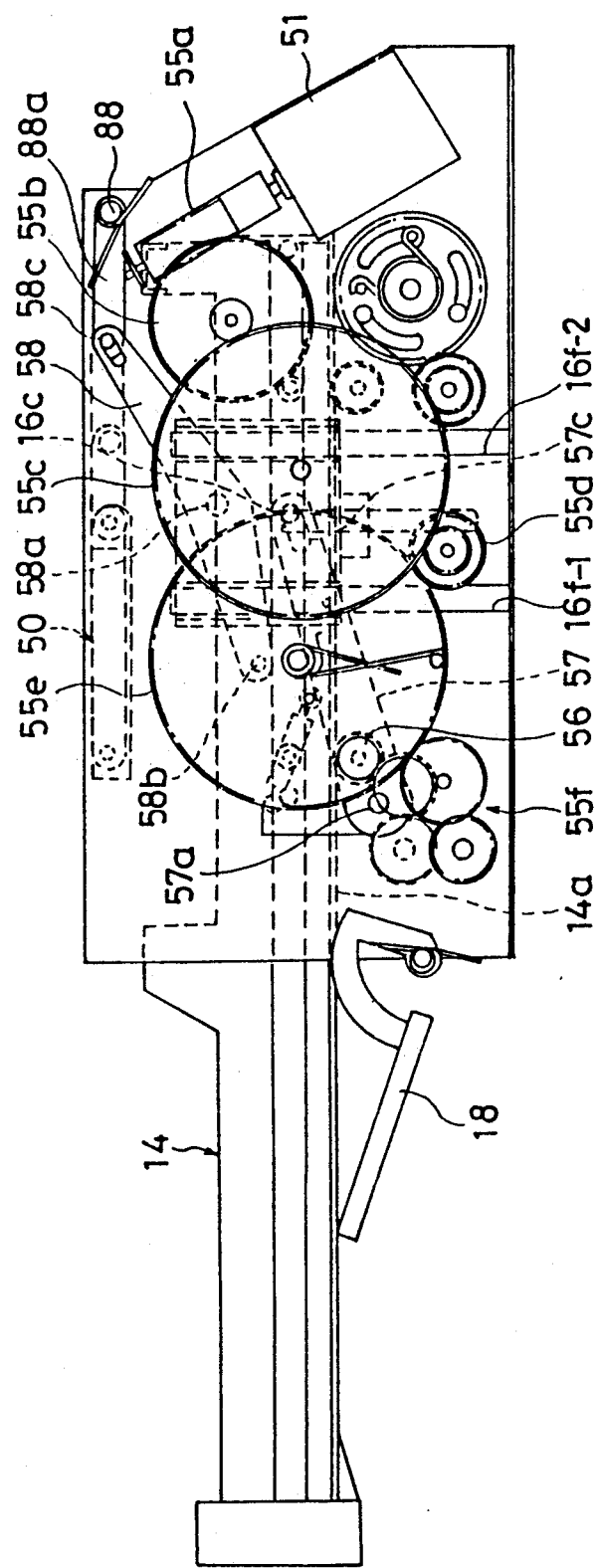
Figure 19:
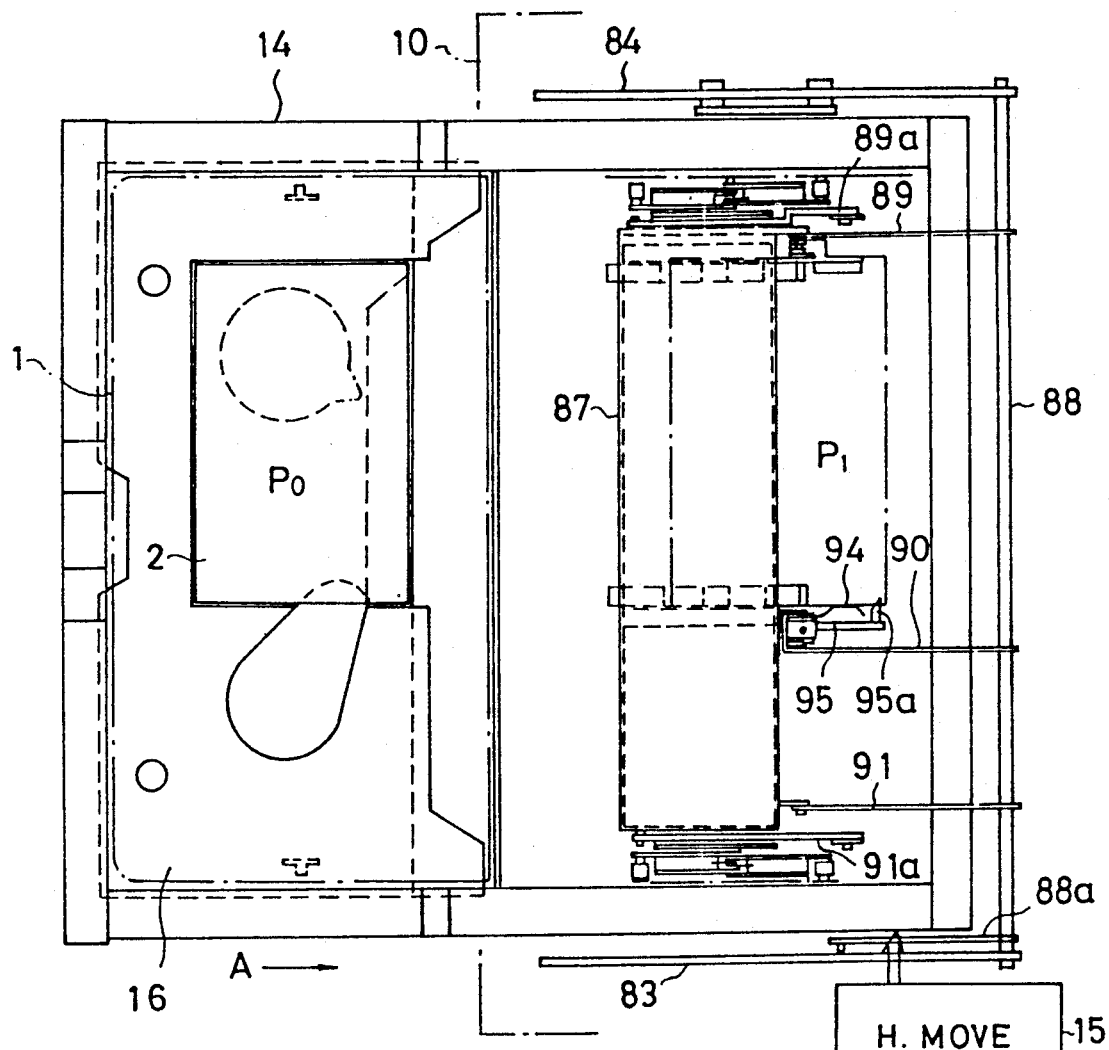
FIGS. 19 and 20 are a plan view and a side view respectively showing the mechanisms in FIG. 18 in relation to the overall construction of the cassette loading system of the present invention.

Referring to FIG. 8, the cassette carriage moving mechanism 15 comprises the motor 51, and a series of reduction gears 55a-55f and 56 held on a pair of side plates 83 and 84 fixed on the body 10 of the video tape recorder (FIG. 19). The gears 55a-55f and 56 cooperate with the motor 51, and teeth 14a provided at the bottom of the carriage 14 so as to mesh with the gear 56. Responsive to the driving of the motor 51, the gear 56 is driven and the carriage 14 is moved in the direction indicated by the arrows $X_1$ and $X_2$ in FIGS. 3-5.

Figure 9:
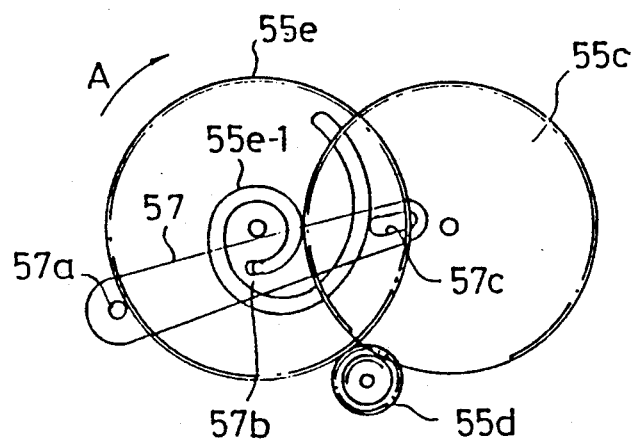
Figure 9:
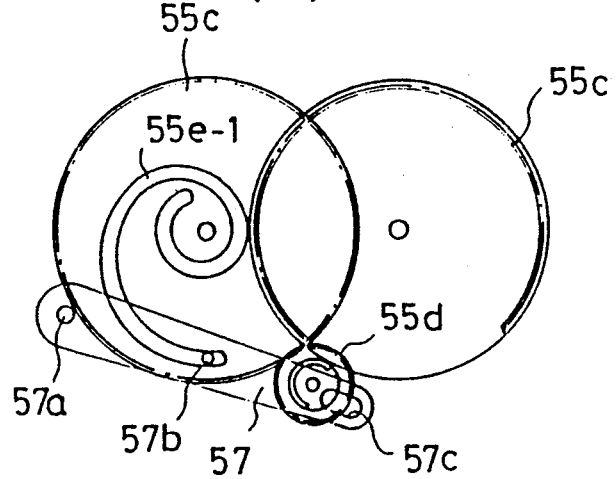

FIG. 8 also shows the cassette tray elevating mechanism 17. Referring to the drawing, the mechanism 17 comprises the gears 55a-55e and an arm 57 held on the side plates 83 and 84. The gear 55e in, the drawing has a guide groove $55_{e-1}$ on a side facing toward the cassette tray 16 which engages the arm 57 as will be described. An end of the arm 57 is pivoted on a pin 57a on the side plates 83 and 84 and a pin 57b at an intermediate portion of the arm 57 engages the guide groove $55_{e-1}$ (FIG. 9). Thus, the arm 57 is swung upwards and downwards responsive to the rotation of the gear 55e. Further, the arm 57 has an elongated hole 57c at its the other end, and the hole 57c engaged a pin 16c provided on a holder 16f which in turn holds the cassette tray 16 as shown in FIGS. 10(A) and (B). The holder 16f is movable vertically along a pair of slots $16_{f-1}$ and $16_{f-2}$ shown in FIG. 8 and is moved by the arm 57. The groove $55_{e-1}$ has a generally spiral shaped pattern, in which there is formed a concentric portion at the innermost portion of the groove where the groove locates at a same distance from the center of the gear. Continuing to this concentric portion, a spiral portion is formed in which the distance of the groove from the center of the gear increases with the rotation of the gear 55e. Thus, the arm 57 remains stationary for a predetermined angle of rotation of the gear 55e, and after this predetermined angle of rotation, the arm 57 is rotated upwardly or downwardly around the pin 57a responsive to the direction of the rotation of the motor 51.

FIGS. 10(A) and (B) show a link mechanism 17a which constitutes a part of the tray elevating mechanism 17. It should be noted that the link mechanism 17 is provided close to the front side of the cassette carriage 14. The link mechanism 17a comprises a first link $17_{a-1}$ and a second link $17_{a-2}$ connected to each other at a center by a pin 17b so as to form an X-shaped mechanism. An end of the first link $17_{a-1}$ is connected to a pin 14b provided on the cassette table 14 and the other end of the first link carries a roller $17_{a-3}$ which engages an elongated groove 16d formed on the cassette tray 16. Further, an end of the second link $17_{a-2}$ is connected to a pin 16e formed on the cassette tray 16 and the other end of the second link carries a roller $17_{a-4}$ which engages an elongated groove 14c formed on the cassette table 14.

Next, the operation of the cassette tray elevating mechanism 17 will be described. Responsive to the operation of the switch 54, the motor 51 is started and the cassette carriage is transported in the direction indicated by $X_2$ from the state shown in FIG. 5 to the state shown in FIG. 6 as a result of the driving of the tooth 14a at the bottom of the cassette carriage 14 as already described. During this period, the arm 57 remains stationary, as the pin 57b of the arm 57 engages the concentric portion of the guide groove $55_{3-1}$. When the cassette carriage reaches the state shown in FIG. 6, the pin 57b of the arm 57 engages the spiral portion of the guide groove $55_{e-1}$ and the arm 57 is rotated in the downward direction around the pin 57a held on the side plate 83 and 84. Responsive to the lowering of the arm 57, the pin 16c on the cassette tray 16 is moved by the arm 57 and the cassette tray 16 is moved in the downward direction. It should be noted that the downward movement of the cassette tray induces a deformation of the link mechanism 17a such that the roller $17_{a-2}$ of the first link $17_{a-1}$ moves in the horizontal elongated groove 16d in the cassette tray 16 and the roller $17_{a-4}$ of the second link $17_{a-2}$ moves in the horizontal groove 14c in the cassette carriage. As a result, the distance between the pin 14b and the pin 16e and the distance between the roller $17_{a-3}$ and the roller $17_{a-4}$ are maintained the same during the deformation of the link 17a. Thus, the cassette tray 16 is kept horizontal during the descent of the cassette tray from the state shown in FIG. 6 to the state shown in FIG. 7. The operation of the mechanisms 15 and 17 in the reverse direction is identical except for the direction of operation, and further description for the operation of these mechanisms in the reverse direction will be omitted.

FIGS. 10(A) and (B) also show an actuating member 40e which is a part of the separated tray portion 40 provided at one or both ends of the generally L-shaped separated tray portion 40. When the cassette tray 16 is moved into the state shown in FIGS. 6 and 7 or FIGS. 10(A) and (B), the member 40e is engaged with a slope 200 formed on a ceiling portion 201 which is a part of the video tape recorder body 200 and forming an upper boundary of the loading system and the separated tray portion 40 is rotated around the pin 40d. Thus, the front end of the tape cassette 1 or 2 carrying the front lid 1c or 4 is exposed.

FIGS. 8, 10(A) and 10(B) also show a cassette holding mechanism 50 which holds the tape cassette by applying a downwardly acting force. The mechanism 50 is a link mechanism comprising a first link 89 and a second link 90 which will be described in detail with reference to the lid opening mechanism shown in FIGS. 18-25. These links 89 and 90 carry a top plate 87 (FIG. 20) which makes contact with the top of the tape cassette 1 or 2 and holds the cassette firmly between the cassette tray 16.

Next, a mechanism for preventing the loading of the tape cassette in an improper state which constitutes another essential part of the present invention will be described with reference to FIGS. 3, 4, 5 and 11-17. In the drawings, those portions constructed identically to those corresponding portions in the previous drawings are given identical reference numerals and the description thereof will be omitted.

Referring to FIGS. 3-5, the loading system of the present invention has a pair of sensors 60 and 61 on the cassette tray 16 for detecting the placement of the standard size tape cassette 1 on the cassette tray. The sensors 60 and 61 are switches which are closed responsive to the weight of the tape cassette and are disposed close to both ends of a diagonal line extending from an upper right corner of the cassette tray to a lower left corner of the cassette tray 16. As can be clearly seen in FIG. 11, for example, the sensors have actuating pins 60a and 61a which project in the upward direction from the switches 60 and 61. Responsive to the placement of the tape cassette, the actuating pins 60a and 61a are pushed in the downward direction by the weight of the tape cassette and the switches are closed.

Further, another pair of sensors 73 and 74 are provided on the depression 30 generally close to both ends of a diagonal line extending form an upper right corner of the depression 30 to a lower left corner of the depression 30. Both of the sensors 73 and 74 are switches similar to the switches 60 and 61 and have actuating pins 73a and 74a as clearly illustrated in FIG. 11. The length of the pins 73a and 74a are chosen such that the tip end of the pins 73a and 74a does not extend beyond the depression 30 on the surface of the cassette tray 16.

Figure 11:
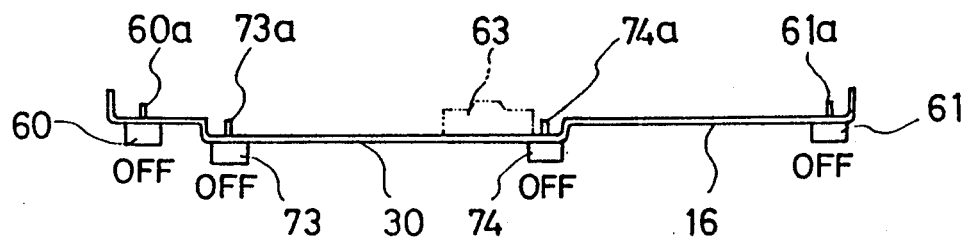
FIG. 11 is a front view of the cassette tray of FIG. 3.

FIGS. 3 and 11 also show a projection 63 for prevention of erroneous loading of the tape cassette. When the tape cassette 1 is properly placed on the cassette tray 16, the projection 63 engages the depression 1d at the bottom of the tape cassette 1 as shown in FIG. 12.

The electrical state of the switches 60, 61, 73, and 74 are summarized in a table shown in FIG. 16. Referring to the drawing, the closed state of the switches are represented by a number 1 and the opened state of the switches are represented by a number 0. Thus, the state of tape cassette on the cassette tray 16 is represented by a four digit binary number such as 0000, 1100, 1000, 0100, 0011, and 0001 in which the first bit (the most significant bit) represents the state of the switch 60, the second bit represents the state of the switch 61, the third bit represents the state of the switch 73 and the fourth bit (the least significant bit) represents the state of the switch 74. The state 0000 indicates that no tape cassette is placed on the cassette tray 16.

Figure 12:
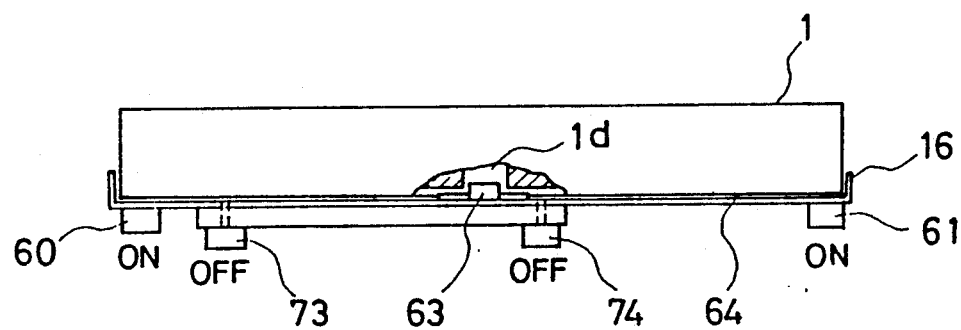
FIG. 12 is a front view showing the standard size tape cassette placed properly on the cassette tray of FIG. 3.
Figure 13:
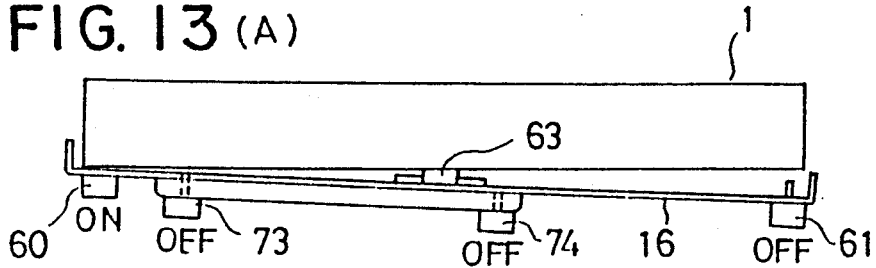
FIG. 13(A) and 13(B) are front views showing improper states of the standard size tape cassettes placed improperly on the cassette tray of FIG. 3.
Figure 13:
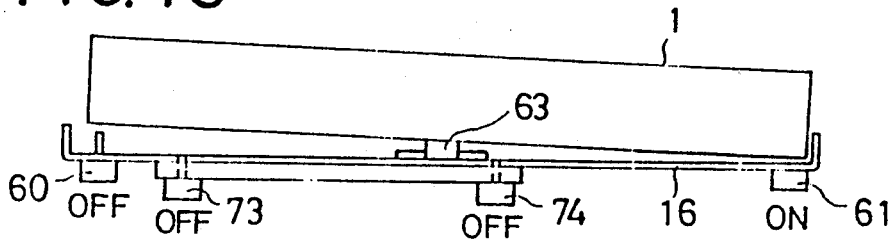

FIG. 12 shows a state in which the standard size tape cassette 1 is placed on the cassette tray properly. In this state, the projection 63 engages with the depression 1d as aforementioned and the tape cassette 1 10 actuates the pins 60a and 61a of the switches 60 and 61 while it does not actuate the pins 73a and 74a of the switches 73 and 74. Thus, the state of the switches corresponding to this proper cassette state is represented as 1100.

FIGS. 13(A) and (B) represent the state in which the standard size tape cassette 1 is placed on the cassette tray 16 in a wrong direction. In this state, the projection 63 abuts with the bottom of the tape cassette 1 and the cassette 1 is held on the cassette tray 16 in a slightly lifted state as shown in the drawings. In this state only one of the switches 60 and 61 is closed while the rest of the switches are opened. Thus the electrical state corresponding to this cassette state is represented as 1000 or 0100.

Figure 14:
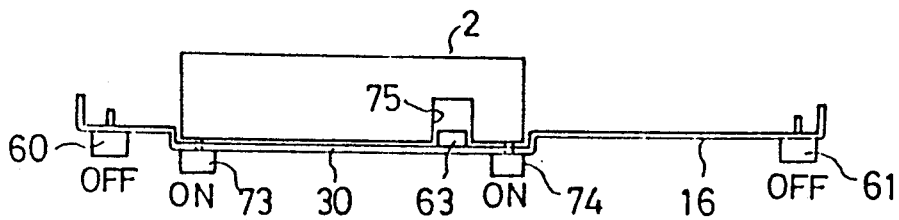
FIG. 14 is a front view showing a proper state of the compact size tape cassette placed properly on the cassette tray of FIG. 3.

FIG. 14 shows a state in which the compact size tape cassette 2 is placed on the depression 30 of the cassette tray 16 in a proper state. In this state, a brake release pin (not shown) on the depression 30 is engaged with a depression 75 at the back of the tape cassette 2 (see FIG. 2(A)) and the tape cassette 2 is placed horizontally on the cassette tray 16. Thus, the actuating pins 73a and 74a are pressed by a bottom 76 (FIG. 2(A)) of the tape cassette 2 and the switches 73 and 74 are closed. On the other hand, the switches 60 and 61 are opened. Thus, the electrical signal corresponding to this state is represented by 0011.

Figure 15:
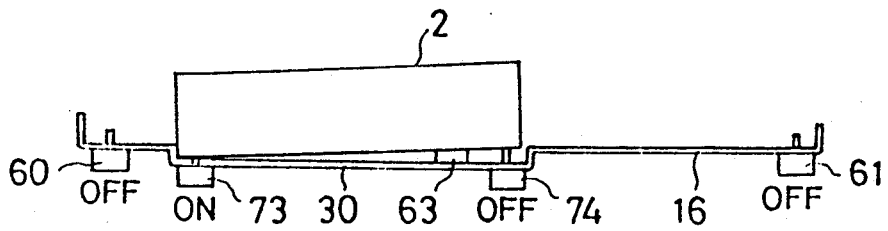
FIGS. 15(A) and 15(B) are front views showing improper states of the compact size tape cassette placed improperly on the cassette tray of FIG. 3.
Figure 15:
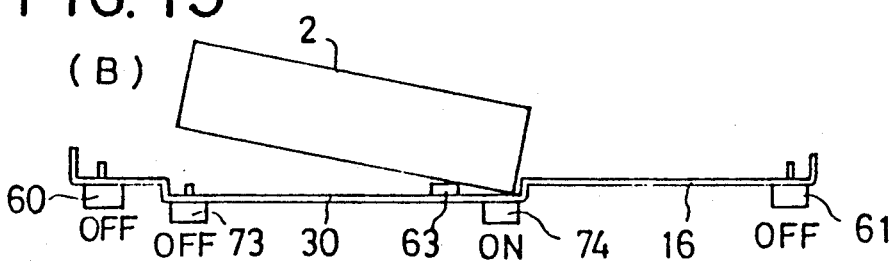

FIGS. 15 (A) and (B) show states in which the compact size tape cassette 2 is placed on the depression 30 on the cassette tray 16 in a wrong state or direction. In this state, the projection 63 abuts the bottom of the tape cassette 2 and the tape cassette 2 is held in such a state that the tape cassette is slightly lifted from the surface of the depression 30. In this state, only one of the switches 73 and 74 is closed but the rest of the switches are opened. Thus, the electrical signal indicating this state is 0010 or 0001.

The electrical signals obtained responsive to the state of the tape cassette on the cassette tray 16 is summarized in the table in FIG. 16. These electrical signals are supplied to a controller 53 shown in FIG. 3, and the controller 53 discriminates the state of the tape cassette on the cassette tray 16 responsive to the electrical signal. The controller 53 further controls the operation of the cassette carriage moving mechanism 15 and the cassette tray elevating mechanism 17 by energizing the motor 51. For this purpose, the controller 53 is constructed as a microcomputer.

Figure 17:
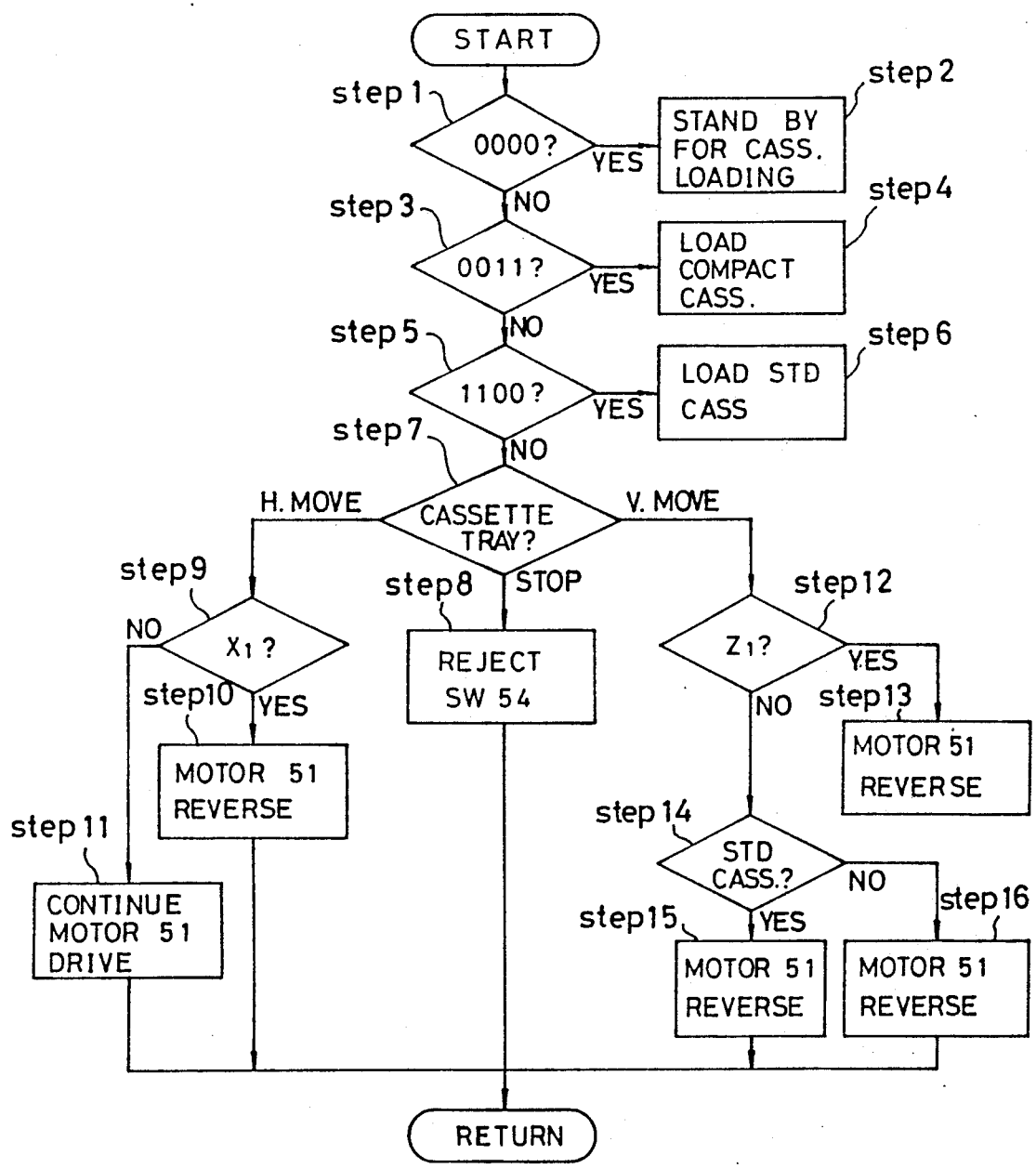
FIG. 17 is a flowchart showing an operation sequence of the control circuit of FIG. 3.

The operation of the controller 53 will now be described with reference to the flowchart in FIG. 17.

In a first step 1, the controller discriminates if the electrical signal is 0000 or not. If the result of discrimination is yes, a predetermined standby procedure for awaiting the loading of the tape cassette is made in a step 2. On the other hand, if the result of discrimination is no, the controller discriminates if the detected electrical signal is 0011 or not in a step 3. If the result of discrimination is yes, a predetermined loading procedure for loading the compact size tape cassette 2 is made in a step 4. If the result of discrimination is no, the controller discriminates if the detected electrical signal is 1100 or not in a step 5. If the result is yes, a predetermined loading procedure for loading the standard size tape cassette 1 is made in a step 6. If the result is no, this means that the cassette tray 16 is placed with the compact size tape cassette 1 or with the standard size tape cassette 2 in an improper state or orientation, or that the tape cassette is displaced to an improper state during the movement with the cassette tray 16, and the state of the cassette tray 16 is further discriminated at a step 7. If it is discriminated that the cassette tray 16 is stationary, a flag is set in a step 8 so that the operation of the switch 54 to start the loading is ignored. Responsive to the procedure in the step 8, the activation of the cassette carriage moving mechanism due to the operation of the switch 54 is cancelled and the erroneous loading of the tape cassette is positively prevented.

Next, the operation of the controller 53 in the case that the tape cassette is displaced from the proper state during the loading procedure of the tape cassette will be described. Such a state corresponds to a state in which the cassette tray 16 is not stationary when the electrical signal indicating the improper cassette state is obtained.

When it is discriminated that the cassette tray 16 is moving in the horizontal direction, the direction of the movement is discriminated in a step 9 if the movement is in the $X_1$ direction or not. If the result is yes, this means that the displacement of the tape cassette took place during the loading procedure in which the tape cassette is transported in the direction of the drum 13 of the video tape recorder, and the motor 51 is immediately reversed in a step 10. With this procedure, the cassette tray 16 is returned to the state as shown in FIG. 5. If it is discriminated that the cassette tray 16 is not moving in the $X_1$ direction, this means that the cassette tray is moving to the state shown in FIG. 5 and the driving of the motor 51 is continued.

When it is discriminated in the step 46 that the cassette tray 16 is moving in the vertical direction, the direction of the movement of the cassette tray is discriminated in a step 12. If the cassette tray 16 is moving in the $Z_1$ direction, this means that the cassette tray 16 is being transported toward the drum 13 of the video tape recorder and the motor 51 is immediately reversed in a step 13. Responsive to this procedure, the cassette tray is first transported in the $Z_2$ direction and thereafter in the $X_2$ direction and is returned to the state shown in FIG. 5.

If the direction of the movement of the cassette tray 16 is not in the $Z_1$ direction, this means that the cassette is displaced from the proper state during the vertical movement of the cassette tray 16 and the type of the cassette is discriminated in the step 14. If it is discriminated that the standard size tape cassette 1 is placed on the cassette tray 16, the motor 51 is reversed and the tape cassette 1 is returned to the loading position as illustrated in FIG. 7 in a step 15. If it is discriminated that the compact size tape cassette 2 is placed on the cassette tray 16, the motor 51 is also reversed and the tape cassette 2 is returned to the loading position as illustrated in FIG. 5 in a step 16.

As described heretofore, the loading of the tape cassette is prevented when the displacement of the tape cassette from the proper position is detected during the movement of the cassette tray 16 in the $X_1$ direction or in the $Z_1$ direction and the cassette tray 16 is returned to the state shown in FIG. 5.

Next, a lock releasing mechanism used in the tape cassette loading system of the present invention will be described. Before describing the lock releasing mechanism of the present invention, the problem of the conventional lock releasing mechanism will be explained with reference to FIG. 2(D) showing the locking mechanism 5 of the compact size tape cassette 2.

As previously described, the protection lid 4 of the tape cassette 2 is locked to the closed state when it is not loaded on the video tape recorder by means of the locking mechanism 5 comprising the projection 9a at the tip end of the resilient plate 9 and a corresponding depression 4a formed on a side portion of the lid 4. The plate 9 is held on the side wall of the tape cassette housing 2c at the holding member 6a and is moved toward the inside of the tape cassette 2 when the square projection 7 formed on the plate 9 and projecting through the side wall 6 is pressed by the lock releasing mechanism of the loading system. The plate 9 is made of a resilient plastic material and is urged to the locked state in which the projection 9a engages the depression 4a.

When in the unlocked state, the projection 7 is pressed as aforementioned and the plate 9 is deformed. In the prior art loading systems, this projection 7 is continuously pressed by the unlocking mechanism as long as the tape cassette is loaded in the video tape recorder. Therefore, the resilient plate 9, which is made of a plastic material, tends to be deformed permanently. When such a permanent deformation takes place in the resilient plate 9, the protection lid 4 can no longer be locked in the closed position when the tape cassette is taken out from the video tape recorder and the protection of the magnetic tape against the penetration of dust is deteriorated. Thus, a lock releasing mechanism which does not act continuously on the projection 7 in the video tape recorder is desired.

Figure 20:
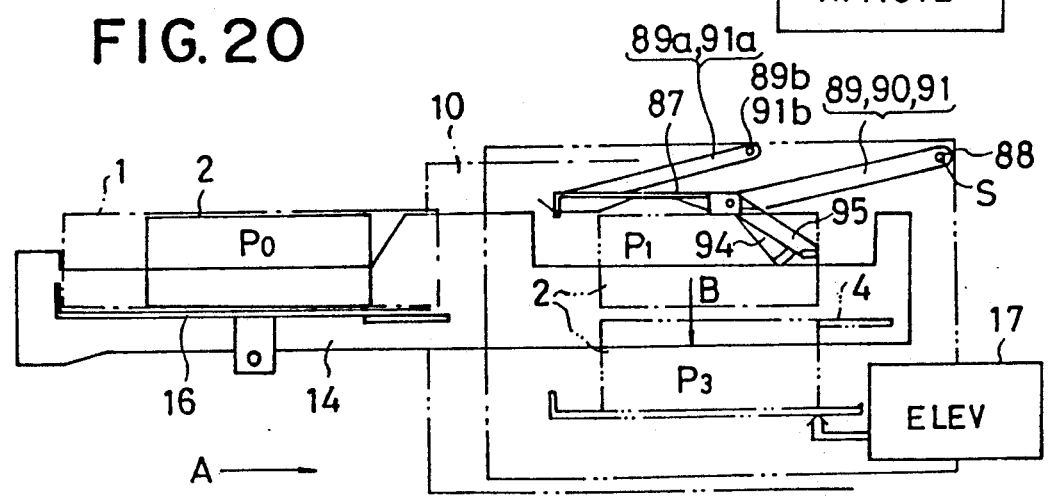
Figure 21:
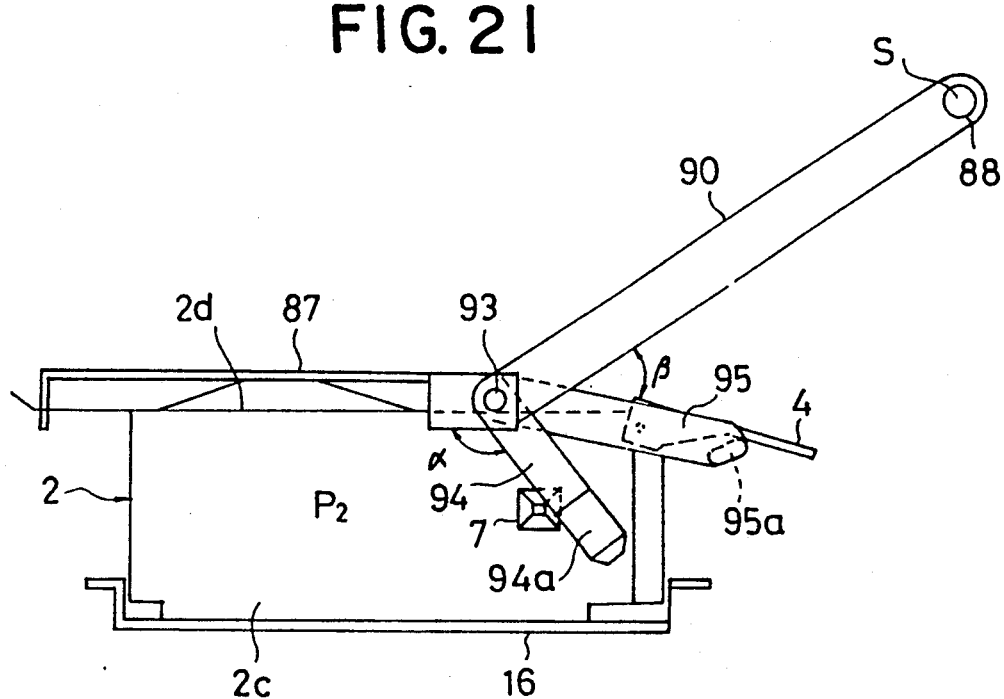
FIG. 21 is a side view showing the lock releasing mechanism and the lid opening mechanism in FIG. 18 in a state that the compact size tape cassette is located immediately before the loading position of the magnetic tape and the lock releasing mechanism is about to disengage a locking mechanism of the tape cassette.
Figure 22:
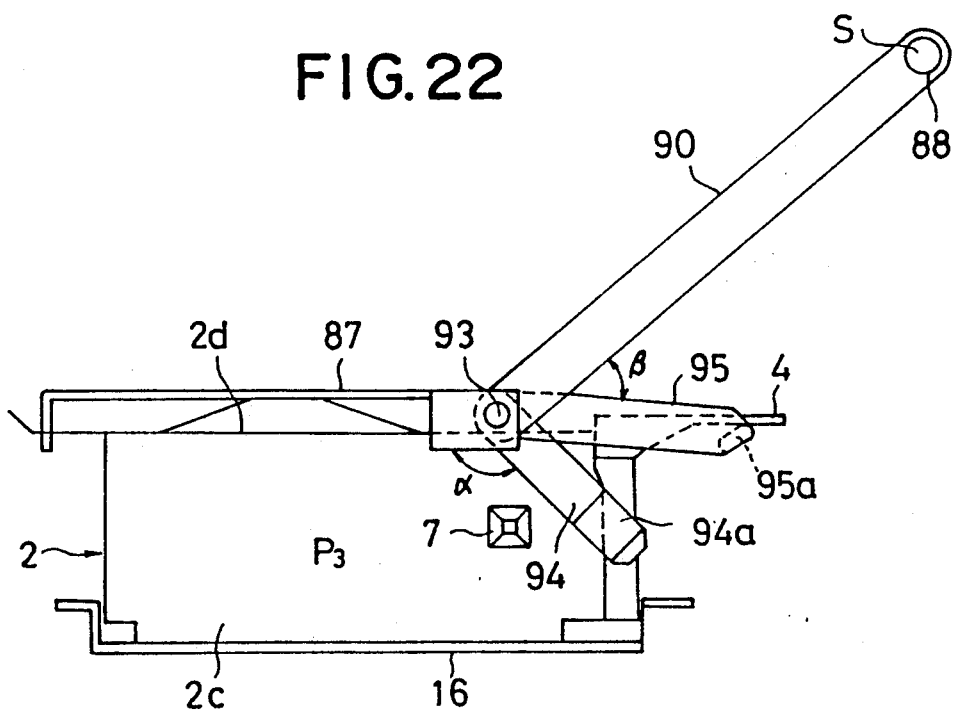
FIG. 22 is a side view showing the lock releasing mechanism and the lid opening mechanism in FIG. 18 in a state that the compact size tape cassette is located at the loading position of the magnetic tape.

FIGS. 19 and 20 show an overall construction of the lock releasing mechanism used in the loading system of the present invention. FIG. 19 is a plan view similar to FIG. 3. In order to clearly illustrate the lock releasing mechanism, the drawing is considerably simplified and the illustration of unrelated parts and portions is omitted. In the drawings, those portions constructed identically to those corresponding portions in the previous drawings are given identical reference numerals and the description thereof will be omitted. It should be noted that the positions of the cassette tray 16 corresponding to the states in FIGS. 5-7 are represented by P0, P1 and P3 (the position P2 will be described later).

FIGS. 19 and 20 show a cassette pressing plate 87 for pressing the top wall 2d of the tape cassette 2 shown in FIGS. 2(B) and (C). The plate 87 is connected to respective ends of the link arms 89, 90 and 91 at three different locations as shown in FIG. 19. The link arms 89, 90 and 91 have an identical arm length and are connected, on the other hand, to a supporting shaft 88 provided between the pair of side plates 83 and 84. As aforementioned, the side plates 83 and 84 are fixed on the body 10 of the video tape recorder. The plate 87 is further held by a pair of arms 89a and 91a at both sides as illustrated. The arms 89a and 91a are connected to the side plates 83 and 84 by respective shafts 89b, 91b at a same level as the level of the shaft 88 in a rotatable manner and further connected to the plate 87 at a position relatively far from the point of connection where the shafts 89, 90 and 91 are connected to the plate 87 in a rotatable manner. The distance between the shaft 88 and the shafts 89b, 91b and the distance between the point where the arms 89–91 are connected to the plate 78 and the point where the arms 89a and 91a are connected to the plate 87 are chosen to be substantially equal. Further, the length of the arms 89–91 and the length of the arms 89a and 91a are chosen to be substantially the same. Thus, the arms 89–91 and the arms 89a and 91a are maintained parallel and the plate 87 is held substantially horizontal during its descent responsive to the rotation of the shaft 88.

Figure 18:
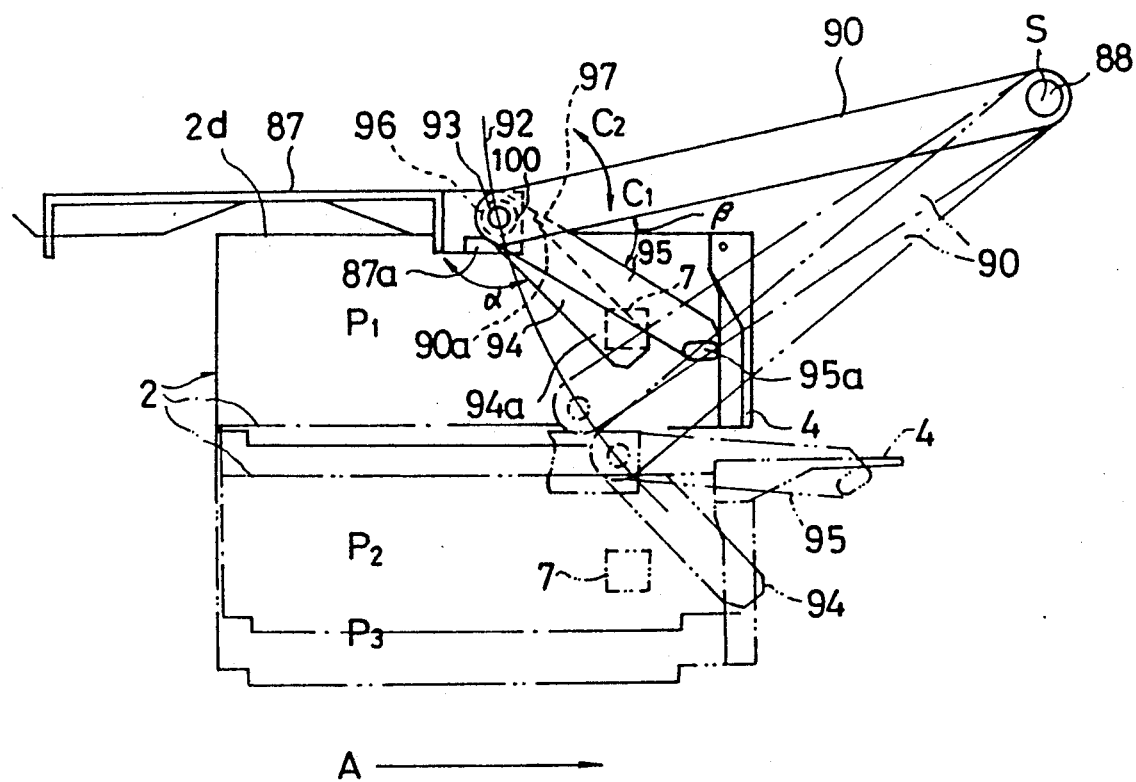
FIG. 18 is a side view showing an embodiment of a lock releasing mechanism and a lid opening mechanism used in the cassette loading ,system of the present invention shown in FIG. 3.

When the cassette tray 16 is transported from the position shown in FIG. 5 to the position shown in FIG. 6, the plate 87 is located at a position shown by a solid line in FIG. 18. Responsive to the descent of the tape cassette 1 or 2, the link arms 89, 90 and 91 are lowered by the rotation of the shaft 88, and the plate 87 is lowered together with the descent of the tape cassette along a circle 92 around the shaft 88 with a radius corresponding to the length of the link arms. At the same time, the arms 89a and 91a at both ends of the plate 87 are lowered and the plate 87 is maintained horizontal during the descent of the tape cassette.

The mechanism for rotating the shaft 88 is shown in FIG. 8. Referring to FIG. 8, another swing arm 58 is held on the side plate 83, 84 in a rotatable manner around a pin 58a. Further, an end of the swing arm 58 carries a pin 58b which engages the groove $55_{e-1}$ and the other end of the swing arm 58 is provided with an elongated opening 58c. Further, another arm 88a is provided on the shaft 88 as shown in FIGS. 8 and 19. The arm 88a has a pin at its end for engagement with the opening 58c at the other end of the swing arm 58. Thus, the arm 88a is swung responsive to the descent of the cassette tray 16 and the arm 88 is rotated responsive to the movement of the shaft 88.

Next, the lock releasing mechanism of the present invention will be described in detail.

Figure 23:
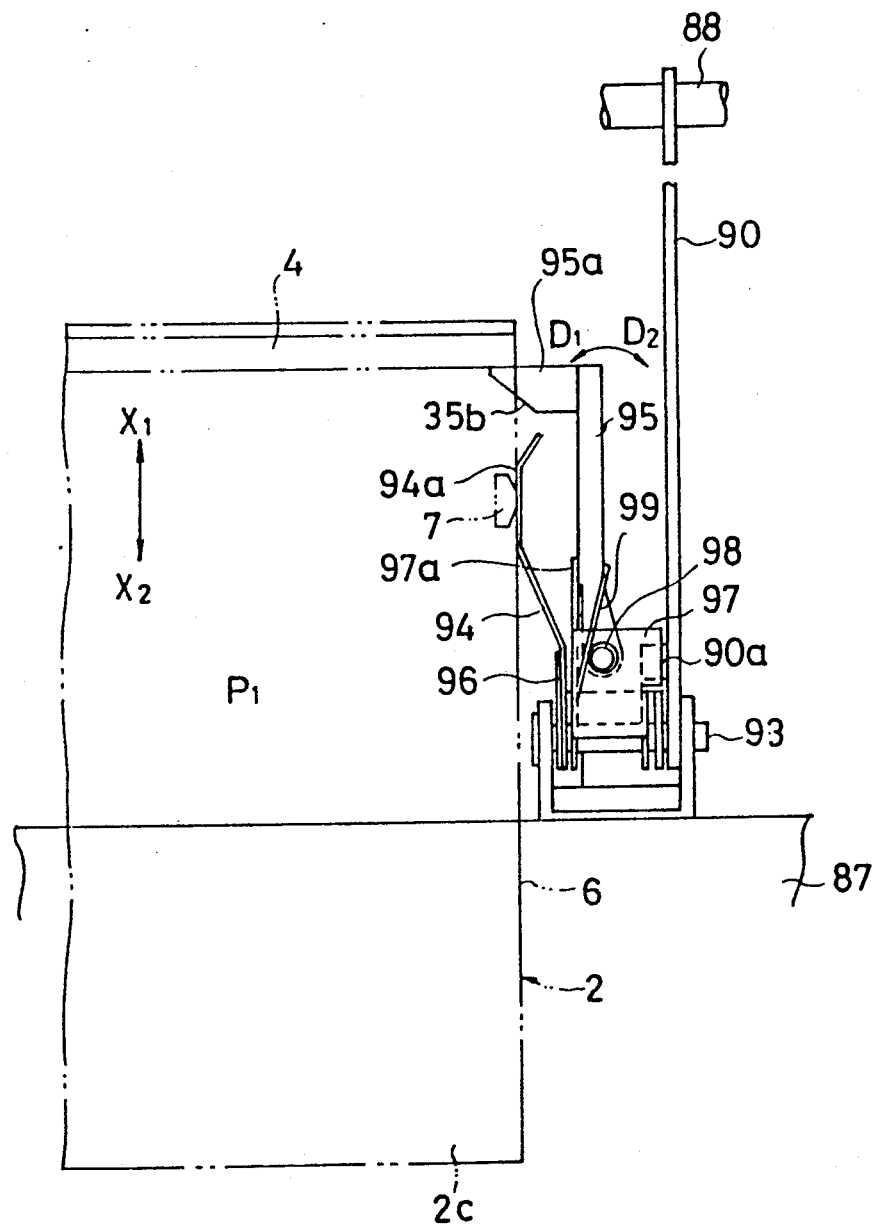
FIG. 23 is a plan view showing the arrangement of the lock releasing mechanism and the lid opening mechanism in FIG. 18 viewed from an upward position.

As clearly seen in FIGS. 18 and 20, the shaft 88 is positioned at a position S in a front side (the direction A) of the tape cassette 2 located at the position P1. Further, the position of the shaft 88 is slightly higher than the level of the tape cassette 2 held in this state. The link arm 90 and the cassette pressing plate 87 are connected rotatably by a pin 93 such that the plate 87 can rotate freely relative to the link arm 90. As can be seen in FIG. 23, the pin 93 carries a lock releasing member 94 and a lid opening member 95 respectively used for releasing the locking mechanism 5 of the tape cassette and for opening the lid 4 of the tape cassette 2. The lock releasing member 94 is provided in a manner such that a base portion of the member 94 is fitted around the pin 93 and is urged in a direction indicated by an arrow C1 in FIG. 18 by a spring 96. Further, the member 94 is prevented from rotating further by engaging with a stopper 87a formed on the plate 87 illustrated in FIG. 18. Thus, the lock releasing mechanism 94 moves together with the cassette pressing plate 87 while maintaining an angle $\alpha$ relative to the plate 87 as shown in FIG. 18. The lock releasing member 94 is an elongated leaf spring and carries a pressing part 94a (FIG. 23) for pressing the projection 7 of the locking mechanism 5 of the tape cassette 2. Responsive to the pressing of the projection 7, the lock of the lid 4 of the tape cassette 2 is released.

Referring to FIG. 23, again, the aforementioned pin 93 also carries a support member 97 for supporting the lid opening member 95 in a rotatable manner. The member 95 is formed as an arm and has a base portion which is carried by the support member 97 in a rotatable manner in directions D1 and D2 around a pin 98 held by the member 97. In other words, the lid opening member 95 can rotate or swing in the D1 and D2 directions independent from the support member 97 and at the same time is rotatable in the directions C1 and C2 together with the support member 97.

Further, the lid opening member 95 is urged in the direction D1 around the pin 98 by a spring 99 and is restricted from further rotation by a stopper 97a formed on the support member 97. Furthermore, the member 95 is urged in the direction C1 around the pin 93 by a spring 100 (FIG. 18) unitarily with the support member 97 and is restricted from further rotation by a stopper 90a (FIG. 18) formed on a part of the link arm 90. Thus, the lid opening mechanism 95 moves together with the link arm 90 while maintaining an angle $\beta$ between the member 95 and the link arm 90 as shown in FIG. 18. The lid opening member 95 has a finger 95a at its tip end as shown in FIG. 23.

Next, the operation of the lock releasing mechanism at the time of cassette loading will be described.

Figure 24:
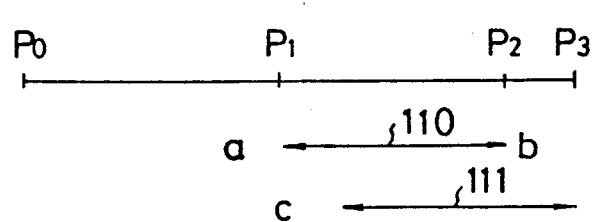
FIG. 24 is a chart showing the timing of operation of the lock releasing mechanism and the lid opening mechanism.

Referring to FIG. 24, the symbols P0, P1, P2 and P3 respectively represent the positions of the tape cassette 2 and the reference numeral 110 indicates the interval in which the depression 7 of the locking mechanism 5 of the tape cassette 2 is pressed. The reference numeral 111 indicates the interval in which the opening of the lid is performed.

Referring to FIG. 18, when the tape cassette 2 is transported by the cassette carriage 14 in the direction A to the position P1 and is located below the cassette pressing plate 87, the projection 7 is located such that the projection 7 faces the pressing part 94a on the lock releasing member 94. During the transportation of the tape cassette to the position P1, the tape cassette 2 pushes the lock releasing member 94 in the direction D2 and the member 94 is deformed elastically. Thereby, the elastic energy is stored in the lock releasing member 94. Thus, when the projection 7 faces the pressing part 94a, the pressing part 94a presses the projection and the plate 9 shown in FIG. 2(D) is deformed. As a result, the projection 9a disengages the depression 4a on the lid 4 and the lock of the lid 4 is released. This state is schematically shown in FIG. 24 by a point a.

Next, the tape cassette 2 is lowered as indicated by the arrow B, and the plate 87 is moved together such that the contact between the plate 87 and the top wall 2d of the tape cassette 2 is maintained. Thereby, the lock releasing mechanism 94 is moved along the circle 92 (FIG. 18) while maintaining the angle $\alpha$ as aforementioned. As the path of movement of the tape cassette 2 and the path of movement of the lock releasing member 94 are not identical, the pressing part 94a on the lock releasing member 94 is displaced relative to the projection 7 on the tape cassette 2. This relative displacement continues gradually and the pressing part 94a disengages the projection 7 at a point b shown in FIG. 24.

When the tape cassette 2 reaches the position P3 which corresponds to the loading position in FIG. 7, the pressing part 94a completely disengages the projection 7 and the plate 9 in the tape cassette is returned to the original state. In other words, the plate 9 in the tape cassette 2 is completely flat when the cassette 2 is in the loaded state in the video tape recorder, and the permanent deformation of the plate 9 due to the prolonged loading of the tape cassette 2 in the video tape recorder is prevented.

Next, the opening of the lid 4 responsive to the descent of the tape cassette 2 from the position P1 to the position P3 will be described.

When the tape cassette 2 is transported in the $X_1$ direction to the position P1 as in FIG. 23, a slope formed on the finger 95a on the lid opening member 95 engages the front end of the tape cassette 2 and the member 95 is momentarily swung in the direction D2. After being swung in the direction D2, the member 95 is returned to the original state and the finger 95 engages an inner side of the lid 4. This situation is clearly seen in the side view shown in, FIG. 18. Next, the tape cassette 2 descends. Responsive to the descent, the member 95 is moved along the circle 92 while maintaining the angle $\beta$ between the link arm 90. As a result of the movement of the member 95, the finger 95a at the tip end portion of the member 95 pushes the lid 4 from behind in the front direction, and the lid 4 is opened against the force exerted by the spring 8. In the position P3, the lid 4 is completely opened as shown in FIG. 18. It should be noted that the opening of the lid 4 by the member 95 is started after the tape cassette 2 starts descending from the position P1. In FIG. 24, the point c represents the position where the lid 4 begins to open. As can be seen clearly from FIG. 24, the lid 4 begins to open only after the lock of the lid 4 is released. At the point b, where the projection 7 of the tape cassette 2 and the pressing part 94a disengage, the lid 4 is already sufficiently opened and the opening of the lid is not obstructed by the disengagement of the lock releasing mechanism.

When the tape cassette 2 is unloaded from the video tape recorder, the operation of the lock releasing mechanism and the lid opening mechanism are reversed. Thus, the lid 4 is closed when the tape cassette 2 is moved from the position P3 to the position P1, and the lid 4 is locked by the locking mechanism 5 when the tape cassette 2 is moved from the position P1 to the position P0. As the locking mechanism 5 of the tape cassette 2 is momentarily released during the closing procedure of the lid 4, the lid 4 is closed without being obstructed.

Figure 25:
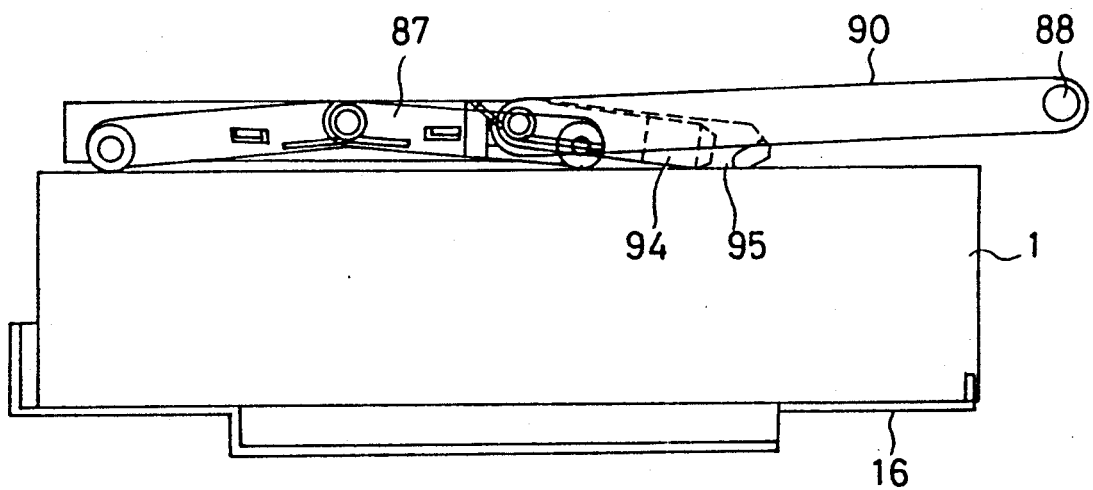
FIG. 25 is a side view showing the state of the lock releasing mechanism and the lid opening mechanism when the standard size tape cassette is placed on the cassette tray of FIG. 3.

It should be noted that the lock releasing member 94 and the lid opening member 95 are displaced when the standard size tape cassette 1 is loaded by the tape cassette 1 itself as illustrated in FIG. 25. Thus, the lock releasing mechanism and the lid opening mechanism for releasing the lock and opening the lid do not obstruct the loading of the standard size tape cassette 1.

Further, various variations and modifications may be made without departing from the scope of the present invention.

What is claimed is:

1. A tape cassette loading system for selectively loading and unloading either one of first and second tape cassettes of different sizes containing a magnetic tape on and from a magnetic information recording and reproducing apparatus so that either one of the first and second tape cassettes assumes a loading state ready for wrapping the magnetic tape contained in the tape cassette around a rotary drum assembly located in a body of the magnetic recording and reproducing apparatus by means of a tape loading mechanism when the selected tape cassette is loaded and such that the selected tape cassette assumes an unloading state ready for removal when the selected tape cassette is unloaded comprising:

a tape cassette holding means comprising a tray having a side wall portion adapted to hold a first tape cassette having a first size so that the first tape cassette placed on the tray engages the tray without substantial play except in a front side direction and further having a depressed portion defined by side wall portions in said tray and adapted to hold a second tape cassette having a second size substantially smaller than the first size so that the second tape cassette placed on the depressed portion engages the depressed portion without substantial play except in a front side direction, said depressed portion being disposed on said tray such that the position of a supply reel of said first tape cassette placed on the tray substantially coincides with the position of a supply reel of said second tape cassette placed on the depressed portion, said tray having a cutout at the front side thereof for accommodating said tape loading mechanism, said cutout being provided adjacent to said front side of said depressed portion;

a carriage means for holding the tape cassette holding means in a manner movable in a horizontal direction between a first state corresponding to the unloaded state of the selected tape cassette in which the tape cassette holding means is located at a first position which is substantially outside of a body of the magnetic recording and reproducing apparatus and a second state in which the tape cassette holding means is located at a second position inside of the body of the magnetic recording and reproducing apparatus, said carriage means having a closing member provided thereon for closing the cutout, said closing member comprising first and second engaging parts which respectively restrict the movement of said first and second tape cassettes in the front side direction when the tape cassette holding means is in said first state and which allows access to said first and second tape cassettes at the front side when the tape cassette holding means is in said loading state;

a driving means for moving the tape cassette holding means horizontally between the first position and the second position; and an elevating mans for moving the tape cassette holding means vertically between the second position and a third position corresponding to the loading state of the tape cassette.

2. A tape cassette loading system as claimed in claim 1 in which said tray further comprises a first projection for engagement with a corresponding depression formed on said first tape cassette when the first tape cassette is placed on the tray and said depressed portion further has second and third projections for engagement with corresponding second and third depressions formed on the second tape cassette when the second tape cassette is placed on the depressed portion.

3. A tape cassette loading system as claimed in claim 1 in which said cutout portion faces said rotary drum assembly of the magnetic recording apparatus, said cutout being adapted so as to allow insertion of said tape loading mechanism of the magnetic recording and reproducing apparatus from a lower direction, and said closing member is hinged by a pin on said carriage means around a horizontal axis extending perpendicularly to the direction of the movement of the carriage means in a manner rotatable between an engaged state in which the closing member engages said front side of the tape cassette holding means so that the cutout is closed when the tape cassette holding means is in said first state and a separated state in which the closing member is separated from the tape cassette holding means, so that the cutout is open when the tape cassette holding means is in said second state.

4. A tape cassette loading system as claimed in claim 3 in which said closing member further comprises a bottom portion for supporting either one of the first and second cassettes placed on the tape cassette holding means when the tape cassette holding means is in said first position,, said first and second engaging parts forming an end portion integral with said bottom portion, and a lever portion extending generally in an upward direction from said end portion for engagement with a cam portion formed on the body of the magnetic recording and reproducing apparatus, said lever portion disengaging said cam portion on the body of the magnetic recording and reproducing apparatus and said closing member being held in said engaged state when the carriage means is in the first state, and said lever portion engaging said cam portion and said closing member being held in said separated state when the carriage means is in the second state.

5. A tape cassette loading system as claimed in claim 1 in which said driving means comprises a motor, a reduction gear system and a plurality of teeth formed at an under side of the carriage means for engagement with the reduction gear system.

6. A tape cassette loading system as claimed in claim 1 in which said elevating means comprises a motor, a reduction gear system, a guide groove having a spiral shape and carried by a gear of said gear system, a swing arm having a first pin held on the body of the tape recorder so as to swing around the first pin, a second pin carried by the swing arm and engaged with the guide groove, an elongated hole extending along the swing arm at its tip end portion remote from the first pin, and a base having a third pin for engagement with the elongated hole and supporting the tape cassette holding means in a movable manner in the vertical direction.

7. A tape cassette loading system as claimed in claim 6 in which said elevating means further comprises a generally X-shaped link arm mechanism comprising a first link arm connected to the carriage means rotatably by a third pin at one end of the first link arm and further connected to the tape cassette holding means by a roller at the other end, said roller engaging slidably with a horizontal groove formed on the tape cassette holding means, and a second link arm connected to said first link arm so as to form a generally X-shaped configuration together with the first link arm by a fourth pin locating at a center of the second link arm, said second link arm being connected to said tape cassette holding means rotatably by a fifth pin at its first end and carrying a roller at the other end so that the roller engages a horizontal groove formed on the carriage means.

8. A tape cassette loading system as claimed in claim 1 further comprising a mechanism for releasing a lock of the second tape cassette held on the tape cassette holding means, said mechanism comprising a rotary shaft driven simultaneously with the activation of said elevating means, a horizontal means connected to the rotary shaft such that the horizontal means is lowered responsive to the rotation of the rotary shaft while maintaining a horizontal attitude, and an elongated member connected to the horizontal means so as to maintain a predetermined angle relative to the horizontal means, said elongated member having an actuating part adapted to engage with a lock release button provided on a side wall of the second tape cassette for releasing a lock of a lid of the second tape cassette when the tape cassette holding means is moved vertically from said second position to said third position so that the lock of the lid is released, said elongated member being further adapted such that the elongated member is disengaged from the button when the tape cassette holding means reaches the third position.

9. A tape cassette loading system as claimed in claim 8 in which said horizontal means comprises a first arm having a first end fixedly connected to said rotary shaft so as to swing around the shaft responsive to the rotation of the shaft, a second arm having a first end connected to the body of the magnetic recording and reproducing apparatus at a level substantially the same as the level of said shaft in a rotatable manner so as to swing freely, and a horizontal plate member connected to a second end of the first arm at a first position and connected to a second end of the second arm at a second position separated from the first position by a distance substantially equal to the distance between the first end of the first arm and the first end of the second arm so that the horizontal plate member is maintained substantially horizontal during the lowering of the plate member responsive to the rotation of the rotary shaft, said elongating ember being held on the first arm in a rotatable manner and held at said predetermined angle by a stopper surface.

10. A tape cassette loading system as claimed in claim 8 in which said elongated member is urged to said predetermined angle relative to the horizontal means by resilient means held on the horizontal means.

11. A tape cassette loading system as claimed in claim 9 in which said horizontal means further carries an elongated lid opening member extending in a direction towards the lid of the second tape cassette held on the tape cassette holding means so as to maintain a predetermined angle relative to the first arm, said lid opening means being carried by the horizontal member so as to swing laterally and having a finger extending in the direction of the second tape cassette held on the tape cassette holding means and adapted for engagement with an inner surface of the lid so that the lid is pushed outwards when the tape cassette holding means is moved from the second position to the third position.

12. A tape cassette loading system as claimed in claim 11 in which said lid opening member is urged to said predetermined angle relative to the first arm by a resilient means held on the first arm.

13. A tape cassette loading system as claimed in claim 11, in which said finger is formed with a sloped part on its tip end at a side which first engages with an outer surface of the lid of the second tape cassette when the second tape cassette is moved horizontally together with the carriage means responsive to the movement of the carriage means from the first position to the second position.

14. A tape cassette loading system as claimed in claim 2 in which said tape cassette holding means further comprises first and second switches activated by a weight of the first tape cassette placed on the tray, said first and second switches being disposed on a surface of the tray, and said depressed portion further comprising third and fourth switches activated by a weight of the second tape cassette placed on the depressed portion.

15. A tape cassette loading system as claimed in claim 14 in which said first and second projections are located at a position substantially offset from a diagonal line extending diagonally through the tray, said first and second switches are disposed in a vicinity of both ends of the diagonal line, and said third and fourth switches are disposed in a vicinity of both ends of another diagonal line extending diagonally through the depressed portion.

16. A tape cassette loading system as claimed in claim 15 further comprising a controller electrically connected to said first through fourth switches for sensing the electrical state of the switches, said controller being further electrically connected to said driving means and elevating means for controlling the operation of the driving means and elevating means such that the operation of the driving means for moving the tape cassette holding means from said first position to said second position and the operation of the elevating means for moving the tape cassette holding means from said second position to said third position are allowed only when both of said first and second switches are activated or both of said third and fourth switches are activated.

17. A tape cassette loading system as claimed in claim 16 in which said controller discriminates whether the tape cassette holding means is moving or not and which one of said driving means and elevating means is moving the tape cassette holding means and in which direction the tape cassette holding means is moving when an anomaly is detected by activation of only one of said first and second switches or only one of said third and fourth switches, said controller cancelling command signals supplies from a user to start the driving means or elevating means when it is discriminated that neither the driving means nor the elevating means is moving the tape cassette holding means and said anomaly is present, said controller further controlling the driving means such that the movement of the tape cassette holding means is continued when it is discriminated that the tape cassette holding means is moving from the second position to the first position and said anomaly is present and that the movement of the tape cassette holding means is reversed when it is discriminated that the tape cassette holding means is moving from the first position to the second position and said anomaly is present.

* * * * *